(12) United States Patent
Muvavarirwa

(10) Patent No.: US 10,687,115 B2
(45) Date of Patent: Jun. 16, 2020

(54) CLOUD-BASED DIGITAL CONTENT RECORDER APPARATUS AND METHODS

(71) Applicant: Time Warner Cable Enterprises LLC, New York, NY (US)

(72) Inventor: Ranga Muvavarirwa, Denver, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 28 days.

(21) Appl. No.: 15/170,787

(22) Filed: Jun. 1, 2016

(65) Prior Publication Data

US 2017/0353768 A1    Dec. 7, 2017

(51) Int. Cl.
*H04N 21/472*     (2011.01)
*H04N 21/2343*    (2011.01)
(Continued)

(52) U.S. Cl.
CPC ... *H04N 21/47202* (2013.01); *H04N 21/2181* (2013.01); *H04N 21/23439* (2013.01);
(Continued)

(58) Field of Classification Search
CPC .......... H04N 21/23418; H04N 21/236; H04N 21/2365; H04N 21/47202; H04N 21/432;
(Continued)

(56) References Cited

U.S. PATENT DOCUMENTS 4,521,881 A    6/1985  Stapleford et al.
4,546,382 A   10/1985  McKenna et al.
(Continued)

FOREIGN PATENT DOCUMENTS

CA    2643806 C    6/2013
GB    2405567 A    3/2005
(Continued)

OTHER PUBLICATIONS

CableLabsel Asset Distribution Interface (ADI) Specification, Version 1 1, MD-SP-ADI1.103-040107, Jan. 7, 2004. pp. 1-26.
(Continued)

*Primary Examiner* — Kunal Langhnoja
(74) *Attorney, Agent, or Firm* — Gazdzinski & Associates, PC

(57) ABSTRACT

Apparatus and methods for the storage and delivery of content over a network. In one embodiment, the network comprises a managed content distribution network, and the apparatus comprises a "cloud" digital video recorder (cDVR) server which stores, processes and assembles content prior to its delivery in a way that obviates superfluous storage, and gains significant network efficiencies. This approach also facilitates various pre-streaming processing in the video recording (e.g., cDVR) system. One or more content libraries adapted to facilitate cDVR content assembly and access are also disclosed. Secondary content (e.g., promotions, advertisements, etc.) can also be selectively inserted into cDVR content. Various access, business or operational rules and methods implementing the foregoing are also described.

23 Claims, 11 Drawing Sheets

(51) Int. Cl.

| | | |
|---|---|---|
| *H04N 21/8543* | (2011.01) | |
| *H04N 21/2747* | (2011.01) | |
| *H04N 21/81* | (2011.01) | |
| *H04N 21/218* | (2011.01) | |
| *H04N 21/432* | (2011.01) | |
| *H04N 21/433* | (2011.01) | |
| *H04N 21/643* | (2011.01) | |
| *H04N 21/854* | (2011.01) | |

(52) U.S. Cl.
CPC . *H04N 21/234309* (2013.01); *H04N 21/2747* (2013.01); *H04N 21/432* (2013.01); *H04N 21/4334* (2013.01); *H04N 21/64322* (2013.01); *H04N 21/812* (2013.01); *H04N 21/8543* (2013.01); *H04N 21/85403* (2013.01)

(58) Field of Classification Search
CPC ........... H04N 21/4334; H04N 21/2181; H04N 21/23439; H04N 21/234309; H04N 21/2747
See application file for complete search history.

(56) References Cited

U.S. PATENT DOCUMENTS

| | | |
|---|---|---|
| 4,602,279 A | 7/1986 | Freeman |
| 4,930,120 A | 5/1990 | Baxter et al. |
| 5,155,591 A | 10/1992 | Wachob |
| 5,233,423 A | 8/1993 | Jernigan et al. |
| 5,313,454 A | 5/1994 | Bustini et al. |
| 5,361,091 A | 11/1994 | Hoarty et al. |
| 5,600,364 A | 2/1997 | Hendricks et al. |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,410 A | 8/1998 | Rao |
| 5,815,662 A | 9/1998 | Ong |
| 5,862,312 A | 1/1999 | Mann et al. |
| 5,878,324 A | 3/1999 | Borth et al. |
| 5,886,995 A | 3/1999 | Arsenault et al. |
| 5,914,945 A | 6/1999 | Abu-Amara et al. |
| 5,926,205 A | 7/1999 | Krause et al. |
| 5,935,206 A | 8/1999 | Dixon et al. |
| 5,963,844 A | 10/1999 | Dail |
| 6,002,393 A | 12/1999 | Hite et al. |
| 6,018,359 A * | 1/2000 | Kermode ........... H04N 21/2381 348/E5.008 |
| 6,047,327 A | 4/2000 | Tso et al. |
| 6,081,830 A | 6/2000 | Schindler |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,330,609 B1 | 12/2001 | Garofalakis et al. |
| 6,337,715 B1 | 1/2002 | Inagaki et al. |
| 6,345,279 B1 | 2/2002 | Li et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,487,721 B1 | 11/2002 | Safadi |
| 6,498,783 B1 | 12/2002 | Lin |
| 6,502,139 B1 | 12/2002 | Birk et al. |
| 6,516,412 B2 | 2/2003 | Wasilewski et al. |
| 6,560,578 B2 | 5/2003 | Eldering |
| 6,590,865 B1 | 7/2003 | Ibaraki et al. |
| 6,594,699 B1 | 7/2003 | Sahai et al. |
| 6,601,237 B1 | 7/2003 | Ten Kate et al. |
| 6,604,138 B1 | 8/2003 | Virine et al. |
| 6,615,039 B1 | 9/2003 | Eldering |
| 6,615,251 B1 | 9/2003 | Klug et al. |
| 6,651,103 B1 | 11/2003 | Markowitz et al. |
| 6,671,736 B2 | 12/2003 | Virine et al. |
| 6,687,735 B1 | 2/2004 | Logston et al. |
| 6,700,624 B2 | 3/2004 | Yun |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,839,757 B1 | 1/2005 | Romano et al. |
| 6,842,783 B1 | 1/2005 | Boivie et al. |
| 6,859,839 B1 | 2/2005 | Zahorjan et al. |
| 6,868,439 B2 | 3/2005 | Basu et al. |
| 6,891,841 B2 | 5/2005 | Leatherbury et al. |
| 6,898,800 B2 | 5/2005 | Son et al. |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,977,691 B1 | 12/2005 | Middleton et al. |
| 6,981,045 B1 | 12/2005 | Brooks |
| 6,985,934 B1 | 1/2006 | Armstrong et al. |
| 6,986,156 B1 | 1/2006 | Rodriguez et al. |
| 7,010,801 B1 | 3/2006 | Jerding et al. |
| 7,017,174 B1 | 3/2006 | Sheedy |
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,073,189 B2 | 7/2006 | McElhatten et al. |
| 7,075,945 B2 | 7/2006 | Arsenault et al. |
| 7,085,839 B1 | 8/2006 | Baugher et al. |
| 7,086,077 B2 | 8/2006 | Giammaressi |
| 7,088,910 B2 | 8/2006 | Potrebic et al. |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |
| 7,107,462 B2 | 9/2006 | Fransdonk |
| 7,110,457 B1 | 9/2006 | Chen et al. |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,385 B2 | 2/2007 | Li |
| 7,178,161 B1 | 2/2007 | Fristoe et al. |
| 7,181,010 B2 | 2/2007 | Russ et al. |

(56) References Cited

U.S. PATENT DOCUMENTS

| | | |
|---|---|---|
| 7,181,760 B1 | 2/2007 | Wallace |
| 7,191,461 B1 | 3/2007 | Arsenault et al. |
| 7,194,752 B1 | 3/2007 | Kenyon et al. |
| 7,194,756 B2 | 3/2007 | Addington et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,225,164 B1 | 5/2007 | Candelore et al. |
| 7,225,458 B2 | 5/2007 | Klauss et al. |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | Maclesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,283,782 B2 | 10/2007 | Sinnarajah et al. |
| 7,296,074 B2 | 11/2007 | Jagels |
| 7,299,290 B2 | 11/2007 | Karpoff |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,320,134 B1 | 1/2008 | Tomsen et al. |
| 7,325,073 B2 | 1/2008 | Shao et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,346,917 B2 | 3/2008 | Gatto et al. |
| 7,352,775 B2 | 4/2008 | Powell |
| 7,355,980 B2 | 4/2008 | Bauer et al. |
| 7,363,371 B2 | 4/2008 | Kirby et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van Rijnsoever et al. |
| 7,434,245 B1 | 10/2008 | Shiga et al. |
| 7,457,520 B2 | 11/2008 | Rossetti et al. |
| 7,464,179 B2 | 12/2008 | Hodges et al. |
| 7,555,006 B2 | 6/2009 | Wolfe et al. |
| 7,567,565 B2 | 7/2009 | La Joie |
| 7,577,118 B2 | 8/2009 | Haumonte et al. |
| 7,602,820 B2 | 10/2009 | Helms et al. |
| 7,617,516 B2 | 11/2009 | Huslak et al. |
| 7,630,401 B2 | 12/2009 | Iwamura |
| 7,689,995 B1 | 3/2010 | Francis et al. |
| 7,690,020 B2 | 3/2010 | Lebar |
| 7,720,986 B2 | 5/2010 | Savoor et al. |
| 7,721,313 B2 | 5/2010 | Barrett |
| 7,757,251 B2 | 7/2010 | Gonder et al. |
| 7,763,360 B2 | 7/2010 | Paul et al. |
| 7,779,097 B2 | 8/2010 | Lamkin et al. |
| 7,783,316 B1 | 8/2010 | Mitchell |
| 7,805,052 B2 | 9/2010 | Nakamura et al. |
| 7,805,741 B2 | 9/2010 | Yeh |
| 7,836,178 B1 | 11/2010 | Bedell et al. |
| 7,908,626 B2 | 3/2011 | Williamson et al. |
| 7,917,008 B1 | 3/2011 | Lee et al. |
| 7,930,715 B2 | 4/2011 | Hendricks et al. |
| 8,122,479 B2 | 2/2012 | Britt |
| 8,170,065 B2 | 5/2012 | Hasek et al. |
| 8,280,982 B2 | 10/2012 | La Joie et al. |
| 8,290,351 B2 | 10/2012 | Plotnick et al. |
| 8,291,453 B2 | 10/2012 | Boortz et al. |
| 8,341,242 B2 | 12/2012 | Dillon et al. |
| 8,359,351 B2 | 1/2013 | Istvan et al. |
| 8,365,212 B1 | 1/2013 | Orlowski |
| 8,392,952 B2 | 3/2013 | Carlucci et al. |
| 8,458,125 B1 | 6/2013 | Chong, Jr. et al. |
| 8,468,099 B2 | 6/2013 | Headings et al. |
| 8,516,533 B2 | 8/2013 | Davis et al. |
| 8,561,116 B2 | 10/2013 | Hasek |
| 8,634,703 B1 | 1/2014 | Barton |
| 8,726,303 B2 | 5/2014 | Ellis, III |
| 8,804,519 B2 | 8/2014 | Svedberg |
| 8,843,973 B2 | 9/2014 | Morrison |
| 8,997,136 B2 | 3/2015 | Brooks et al. |
| 9,071,859 B2 | 6/2015 | Lajoie |
| 9,178,634 B2 | 11/2015 | Tidwell et al. |
| 9,277,266 B2 | 3/2016 | Riedl et al. |
| 9,591,069 B2 | 3/2017 | Thornburgh et al. |
| 2001/0013123 A1 | 8/2001 | Freeman et al. |
| 2001/0030785 A1 | 10/2001 | Pangrac et al. |
| 2001/0050901 A1 | 12/2001 | Love et al. |
| 2002/0004912 A1 | 1/2002 | Fung |
| 2002/0019984 A1 | 2/2002 | Rakib |
| 2002/0032754 A1 | 3/2002 | Logston et al. |
| 2002/0049902 A1 | 4/2002 | Rhodes |
| 2002/0049980 A1 | 4/2002 | Hoang |
| 2002/0053082 A1 | 5/2002 | Weaver et al. |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100059 A1 | 7/2002 | Buehl et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0124249 A1 | 9/2002 | Shintani et al. |
| 2002/0129378 A1 | 9/2002 | Cloonan et al. |
| 2002/0144262 A1 | 10/2002 | Plotnick et al. |
| 2002/0144263 A1 | 10/2002 | Eldering et al. |
| 2002/0144275 A1 | 10/2002 | Kay et al. |
| 2002/0147771 A1 | 10/2002 | Traversat et al. |
| 2002/0152299 A1 | 10/2002 | Traversat et al. |
| 2002/0154655 A1 | 10/2002 | Gummalla et al. |
| 2002/0154885 A1 | 10/2002 | Covell et al. |
| 2002/0162109 A1 | 10/2002 | Shteyn |
| 2002/0163928 A1 | 11/2002 | Rudnick et al. |
| 2002/0164151 A1 | 11/2002 | Jasinschi et al. |
| 2002/0166119 A1 | 11/2002 | Cristofalo |
| 2002/0170057 A1 | 11/2002 | Barrett et al. |
| 2002/0174430 A1 | 11/2002 | Ellis et al. |
| 2002/0178447 A1 | 11/2002 | Plotnick et al. |
| 2002/0196939 A1 | 12/2002 | Unger et al. |
| 2003/0002862 A1 | 1/2003 | Rodriguez et al. |
| 2003/0004810 A1 | 1/2003 | Eldering |
| 2003/0005453 A1 | 1/2003 | Rodriguez et al. |
| 2003/0007516 A1 | 1/2003 | Abramov et al. |
| 2003/0014759 A1 | 1/2003 | Van Stam |
| 2003/0021412 A1 | 1/2003 | Candelore et al. |
| 2003/0023981 A1 | 1/2003 | Lemmons |
| 2003/0025832 A1 | 2/2003 | Swart et al. |
| 2003/0033199 A1 | 2/2003 | Coleman |
| 2003/0037331 A1 | 2/2003 | Lee |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0067554 A1 | 4/2003 | Klarfeld |
| 2003/0074565 A1 | 4/2003 | Wasilewski et al. |
| 2003/0077067 A1 | 4/2003 | Wu et al. |
| 2003/0088876 A1 | 5/2003 | Mao et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0095791 A1 | 5/2003 | Barton et al. |
| 2003/0101449 A1 | 5/2003 | Bentolila et al. |
| 2003/0101451 A1 | 5/2003 | Bentolila et al. |
| 2003/0110499 A1 | 6/2003 | Knudson et al. |
| 2003/0115612 A1 | 6/2003 | Mao et al. |
| 2003/0118014 A1 | 6/2003 | Iyer et al. |
| 2003/0135860 A1 | 7/2003 | Dureau |
| 2003/0139980 A1 | 7/2003 | Hamilton |
| 2003/0140351 A1 | 7/2003 | Hoarty et al. |

(56) References Cited

U.S. PATENT DOCUMENTS

| | | |
|---|---|---|
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0179773 A1 | 9/2003 | Mocek et al. |
| 2003/0182261 A1 | 9/2003 | Patterson |
| 2003/0208763 A1 | 11/2003 | McElhatten et al. |
| 2003/0208783 A1 | 11/2003 | Hillen et al. |
| 2003/0214962 A1 | 11/2003 | Allaye-Chan et al. |
| 2003/0217365 A1 | 11/2003 | Caputo |
| 2003/0229681 A1 | 12/2003 | Levitan |
| 2003/0235393 A1 | 12/2003 | Boston et al. |
| 2003/0237090 A1 | 12/2003 | Boston et al. |
| 2004/0006625 A1 | 1/2004 | Saha et al. |
| 2004/0010807 A1 | 1/2004 | Urdang et al. |
| 2004/0031053 A1 | 2/2004 | Lim et al. |
| 2004/0045030 A1 | 3/2004 | Reynolds et al. |
| 2004/0078809 A1 | 4/2004 | Drazin |
| 2004/0101271 A1 | 5/2004 | Boston et al. |
| 2004/0103437 A1 | 5/2004 | Allegrezza et al. |
| 2004/0109672 A1 | 6/2004 | Kim et al. |
| 2004/0113936 A1 | 6/2004 | Dempski |
| 2004/0123313 A1 | 6/2004 | Koo et al. |
| 2004/0133907 A1 | 7/2004 | Rodriguez et al. |
| 2004/0146006 A1 | 7/2004 | Jackson |
| 2004/0158858 A1 | 8/2004 | Paxton et al. |
| 2004/0163109 A1 | 8/2004 | Kang et al. |
| 2004/0179605 A1 | 9/2004 | Lane |
| 2004/0181800 A1 | 9/2004 | Rakib et al. |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0226044 A1 | 11/2004 | Goode |
| 2004/0244058 A1 | 12/2004 | Carlucci et al. |
| 2004/0254999 A1* | 12/2004 | Bulleit ............... H04N 7/17318 709/207 |
| 2004/0255336 A1 | 12/2004 | Logan et al. |
| 2004/0261114 A1 | 12/2004 | Addington et al. |
| 2004/0261116 A1 | 12/2004 | McKeown et al. |
| 2004/0267880 A1 | 12/2004 | Patiejunas |
| 2004/0267965 A1 | 12/2004 | Vasudevan et al. |
| 2005/0010697 A1 | 1/2005 | Kinawi et al. |
| 2005/0034171 A1 | 2/2005 | Benya |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0076092 A1 | 4/2005 | Chang et al. |
| 2005/0086691 A1 | 4/2005 | Dudkiewicz et al. |
| 2005/0097598 A1 | 5/2005 | Pedlow, Jr. et al. |
| 2005/0108529 A1 | 5/2005 | Juneau |
| 2005/0108768 A1 | 5/2005 | Deshpande et al. |
| 2005/0108769 A1 | 5/2005 | Arnold et al. |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke, II et al. |
| 2005/0125832 A1 | 6/2005 | Jost et al. |
| 2005/0135476 A1 | 6/2005 | Gentric et al. |
| 2005/0152397 A1 | 7/2005 | Bai et al. |
| 2005/0168323 A1 | 8/2005 | Lenoir et al. |
| 2005/0198686 A1 | 9/2005 | Krause et al. |
| 2005/0210510 A1 | 9/2005 | Danker |
| 2005/0223409 A1 | 10/2005 | Rautila et al. |
| 2005/0276284 A1 | 12/2005 | Krause et al. |
| 2005/0283818 A1* | 12/2005 | Zimmermann .... H04N 21/2187 725/134 |
| 2005/0289618 A1 | 12/2005 | Hardin |
| 2005/0289619 A1 | 12/2005 | Melby |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0066632 A1 | 3/2006 | Wong et al. |
| 2006/0073843 A1 | 4/2006 | Aerrabotu et al. |
| 2006/0075449 A1* | 4/2006 | Jagadeesan ............ G06Q 30/02 725/113 |
| 2006/0080408 A1 | 4/2006 | Istvan et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0117374 A1 | 6/2006 | Kortum et al. |
| 2006/0127039 A1 | 6/2006 | Van Stam |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0140584 A1 | 6/2006 | Ellis et al. |
| 2006/0171390 A1 | 8/2006 | La Joie |
| 2006/0171423 A1 | 8/2006 | Helms et al. |
| 2006/0173783 A1 | 8/2006 | Marples et al. |
| 2006/0197828 A1 | 9/2006 | Zeng et al. |
| 2006/0212906 A1 | 9/2006 | Cantalini |
| 2006/0218601 A1 | 9/2006 | Michel |
| 2006/0218604 A1 | 9/2006 | Riedl et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0291506 A1 | 12/2006 | Cain |
| 2006/0294250 A1 | 12/2006 | Stone et al. |
| 2007/0022459 A1 | 1/2007 | Gaebel, Jr. et al. |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0061818 A1 | 3/2007 | Williams et al. |
| 2007/0076728 A1 | 4/2007 | Rieger et al. |
| 2007/0078910 A1 | 4/2007 | Bopardikar |
| 2007/0089127 A1 | 4/2007 | Flickinger et al. |
| 2007/0094691 A1 | 4/2007 | Gazdzinski |
| 2007/0101157 A1 | 5/2007 | Faria |
| 2007/0101370 A1 | 5/2007 | Calderwood |
| 2007/0104456 A1 | 5/2007 | Craner |
| 2007/0106805 A1 | 5/2007 | Marples et al. |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124416 A1 | 5/2007 | Casey et al. |
| 2007/0124781 A1 | 5/2007 | Casey et al. |
| 2007/0130581 A1 | 6/2007 | Del Sesto et al. |
| 2007/0133405 A1 | 6/2007 | Bowra et al. |
| 2007/0153820 A1 | 7/2007 | Gould |
| 2007/0156539 A1 | 7/2007 | Yates |
| 2007/0157234 A1 | 7/2007 | Walker |
| 2007/0162927 A1 | 7/2007 | Ramaswamy et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204313 A1 | 8/2007 | McEnroe et al. |
| 2007/0204314 A1 | 8/2007 | Hasek et al. |
| 2007/0217436 A1 | 9/2007 | Markley et al. |
| 2007/0223380 A1 | 9/2007 | Gilbert et al. |
| 2007/0233857 A1 | 10/2007 | Cheng et al. |
| 2007/0241176 A1 | 10/2007 | Epstein et al. |

(56) References Cited

U.S. PATENT DOCUMENTS

| | | |
|---|---|---|
| 2007/0250872 A1 | 10/2007 | Dua |
| 2007/0250880 A1 | 10/2007 | Hainline |
| 2007/0271386 A1 | 11/2007 | Kurihara et al. |
| 2007/0274400 A1 | 11/2007 | Murai et al. |
| 2007/0276925 A1 | 11/2007 | La Joie et al. |
| 2007/0276926 A1 | 11/2007 | Lajoie et al. |
| 2008/0016526 A1 | 1/2008 | Asmussen |
| 2008/0022012 A1 | 1/2008 | Wang |
| 2008/0040403 A1 | 2/2008 | Hayashi |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0112405 A1 | 5/2008 | Cholas et al. |
| 2008/0134156 A1 | 6/2008 | Osminer et al. |
| 2008/0134165 A1 | 6/2008 | Anderson et al. |
| 2008/0134615 A1 | 6/2008 | Risi et al. |
| 2008/0141175 A1 | 6/2008 | Sarna et al. |
| 2008/0141317 A1 | 6/2008 | Radloff et al. |
| 2008/0152316 A1 | 6/2008 | Sylvain |
| 2008/0155059 A1 | 6/2008 | Hardin et al. |
| 2008/0159714 A1 | 7/2008 | Harrar et al. |
| 2008/0184297 A1 | 7/2008 | Ellis et al. |
| 2008/0192820 A1 | 8/2008 | Brooks et al. |
| 2008/0201748 A1 | 8/2008 | Hasek et al. |
| 2008/0209464 A1 | 8/2008 | Wright-Riley |
| 2008/0212947 A1 | 9/2008 | Nesvadba et al. |
| 2008/0229354 A1 | 9/2008 | Morris et al. |
| 2008/0235732 A1 | 9/2008 | Han et al. |
| 2008/0235746 A1 | 9/2008 | Peters et al. |
| 2008/0244667 A1 | 10/2008 | Osborne |
| 2008/0244682 A1 | 10/2008 | Sparrell et al. |
| 2008/0271068 A1 | 10/2008 | Ou et al. |
| 2008/0273591 A1 | 11/2008 | Brooks et al. |
| 2008/0276270 A1 | 11/2008 | Kotaru et al. |
| 2009/0010610 A1 | 1/2009 | Scholl et al. |
| 2009/0019485 A1 | 1/2009 | Ellis et al. |
| 2009/0025027 A1 | 1/2009 | Craner |
| 2009/0028182 A1 | 1/2009 | Brooks et al. |
| 2009/0037960 A1 | 2/2009 | Melby |
| 2009/0052863 A1 | 2/2009 | Parmar et al. |
| 2009/0052870 A1 | 2/2009 | Marsh et al. |
| 2009/0077614 A1 | 3/2009 | White et al. |
| 2009/0083813 A1 | 3/2009 | Dolce et al. |
| 2009/0100182 A1 | 4/2009 | Chaudhry |
| 2009/0100459 A1 | 4/2009 | Riedl et al. |
| 2009/0165053 A1 | 6/2009 | Thyagarajan et al. |
| 2009/0207866 A1 | 8/2009 | Cholas et al. |
| 2009/0210899 A1 | 8/2009 | Lawrence-Apfelbaum et al. |
| 2009/0210912 A1 | 8/2009 | Cholas et al. |
| 2009/0217326 A1 | 8/2009 | Hasek |
| 2009/0217332 A1 | 8/2009 | Hindle et al. |
| 2009/0220216 A1 | 9/2009 | Marsh et al. |
| 2009/0254600 A1 | 10/2009 | Lee et al. |
| 2009/0260042 A1 | 10/2009 | Chiang |
| 2009/0274212 A1 | 11/2009 | Mizutani et al. |
| 2009/0317065 A1 | 12/2009 | Fyock et al. |
| 2010/0061708 A1 | 3/2010 | Barton |
| 2010/0157928 A1 | 6/2010 | Spinar et al. |
| 2010/0223491 A1 | 9/2010 | Ladd et al. |
| 2010/0235432 A1 | 9/2010 | Trojer |
| 2010/0247067 A1 | 9/2010 | Gratton |
| 2010/0251289 A1 | 9/2010 | Agarwal et al. |
| 2011/0103374 A1 | 5/2011 | Lajoie et al. |
| 2011/0162007 A1 | 6/2011 | Karaoguz et al. |
| 2011/0264530 A1 | 10/2011 | Santangelo et al. |
| 2012/0014255 A1 | 1/2012 | Svedberg |
| 2012/0210382 A1 | 8/2012 | Walker et al. |
| 2012/0278841 A1 | 11/2012 | Hasek et al. |
| 2013/0227608 A1 | 8/2013 | Evans et al. |
| 2013/0325870 A1 | 12/2013 | Rouse et al. |
| 2014/0189749 A1 | 7/2014 | Gordon et al. |
| 2015/0271541 A1 | 9/2015 | Gonder et al. |
| 2015/0324379 A1* | 11/2015 | Danovitz .......... G06F 17/30109 707/825 |
| 2016/0191147 A1 | 6/2016 | Martch |
| 2016/0307596 A1 | 10/2016 | Hardin et al. |
| 2018/0097690 A1 | 4/2018 | Yocam et al. |
| 2018/0131975 A1 | 5/2018 | Badawiyeh et al. |

FOREIGN PATENT DOCUMENTS

| | | |
|---|---|---|
| WO | WO-0110125 A1 | 2/2001 |
| WO | WO-0176236 A1 | 10/2001 |
| WO | WO-0191474 A2 | 11/2001 |
| WO | WO-0219581 A1 | 3/2002 |
| WO | WO-2004008693 A1 | 1/2004 |

OTHER PUBLICATIONS

Cisco Intelligent Network Architecture for Digital Video—SCTE Cable-Tec Expo 2004 information page, Orange County Convention Center, Jun. 2004, 24 pages.

Deering et al., Internet Protocol, Version 6 (Ipv6) Specification, IETF RFC 2460 (Dec. 1998).

DOCSIS 1.0: Cable Modem to Customer Premise Equipment Interface Specification, dated Nov. 3, 2008, 64 pages.

DOCSIS 1.1: Operations Support System Interface Specification, dated Sep. 6, 2005, 242 pages.

DOCSIS 1.1: Radio Frequency Interface Specification, dated Sep. 6, 2005, 436 pages.

DOCSIS 2.0: Radio Frequency Interface Specification, dated Apr. 21, 2009, 499 pages.

DOCSIS 3.0: Cable Modem to CPE Interface Specification, dated May 9, 2017, 19 pages.

DOCSIS 3.0: MAC and Upper Layer Protocols Interface Specification, dated Jan. 10, 2017, 795 pages.

DOCSIS 3.0: Operations Support System Interface Specification, dated Jan. 10, 2017, 547 pages.

DOCSIS 3.0: Physical Layer Specification, dated Jan. 10, 2017, 184 pages.

DOCSIS 3.1: Cable Modem Operations Support System Interface Specification, dated May 9, 2017, 308 pages.

DOCSIS 3.1: CCAP Operations Support System Interface Specification, dated May 9, 2017, 703 pages.

DOCSIS 3.1: MAC and Upper Layer Protocols Interface Specification, dated May 9, 2017, 838 pages.

DOCSIS 3.1: Physical Layer Specification, dated May 9, 2017, 249 pages.

Griffith, et al., Resource Planning and Bandwidth Allocation in Hybrid Fiber-Coax Residential Networks, National Institute of Standards and Technology (NIST), 10 pages, no date.

Internet Protocol DARPA Internet Program Protocol Specification, IETF RFC 791 (Sep. 1981).

Kanouff, Communications Technology: Next-Generation Bandwidth Management—The Evolution of the Anything-to-Anywhere Network, 8 pages, Apr. 1, 2004.

Motorola DOCSIS Cable Module DCM 2000 specifications, 4 pages, copyright 2001.

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, no date, (http://www.imake.com/hopenvision).

SCTE 130-1 2008 Digital Program Insertion—Advertising Systems Interfaces standards.

SCTE 130-10 2013: Digital Program Insertion—Advertising Systems Interfaces Part 10—Stream Restriction Data Model.

SCTE 130-2 2008a: Digital Program Insertion—Advertising Systems Interfaces Part 2—Core Data Elements.

SCTE 130-2 2014 Digital Program Insertion—Advertising Systems Interfaces standards.

SCTE 130-3 2013: Digital Program Insertion—Advertising Systems Interfaces Part 3—Ad Management Service Interface.

(56) References Cited

OTHER PUBLICATIONS

SCTE 130-4 2009: Digital Program Insertion—Advertising Systems Interfaces Part 4—Content Information Service.
SCTE 130-5 2010: Digital Program Insertion—Advertising Systems Interfaces Part 5—Placement Opportunity Information Service.
SCTE 130-6 2010: Digital Program Insertion—Advertising Systems Interfaces Part 6—Subscriber Information Service.
SCTE 130-7 2009: Digital Program Insertion—Advertising Systems Interfaces Part 7—Message Transport.
SCTE 130-8 2010a: Digital Program Insertion Advertising Systems Interfaces Part 8—General Information Service.
SCTE 130-9 2014: Recommended Practices for SCTE 130 Digital Program Insertion—Advertising Systems Interfaces.
SCTE Standards Document ANSI/SCTE 130-1 2013 entitled "Digital Program Insertion—Advertising Systems Interfaces, Part 1—Advertising Systems Overview," 20 pages.
SCTE130-3 2010: Digital Program Insertion—Advertising Systems Interfaces Part 3—Ad Management Service Interface.
Wikipedia, Digital Video Recorder, obtained from the Internet Nov. 11, 2014.

\* cited by examiner

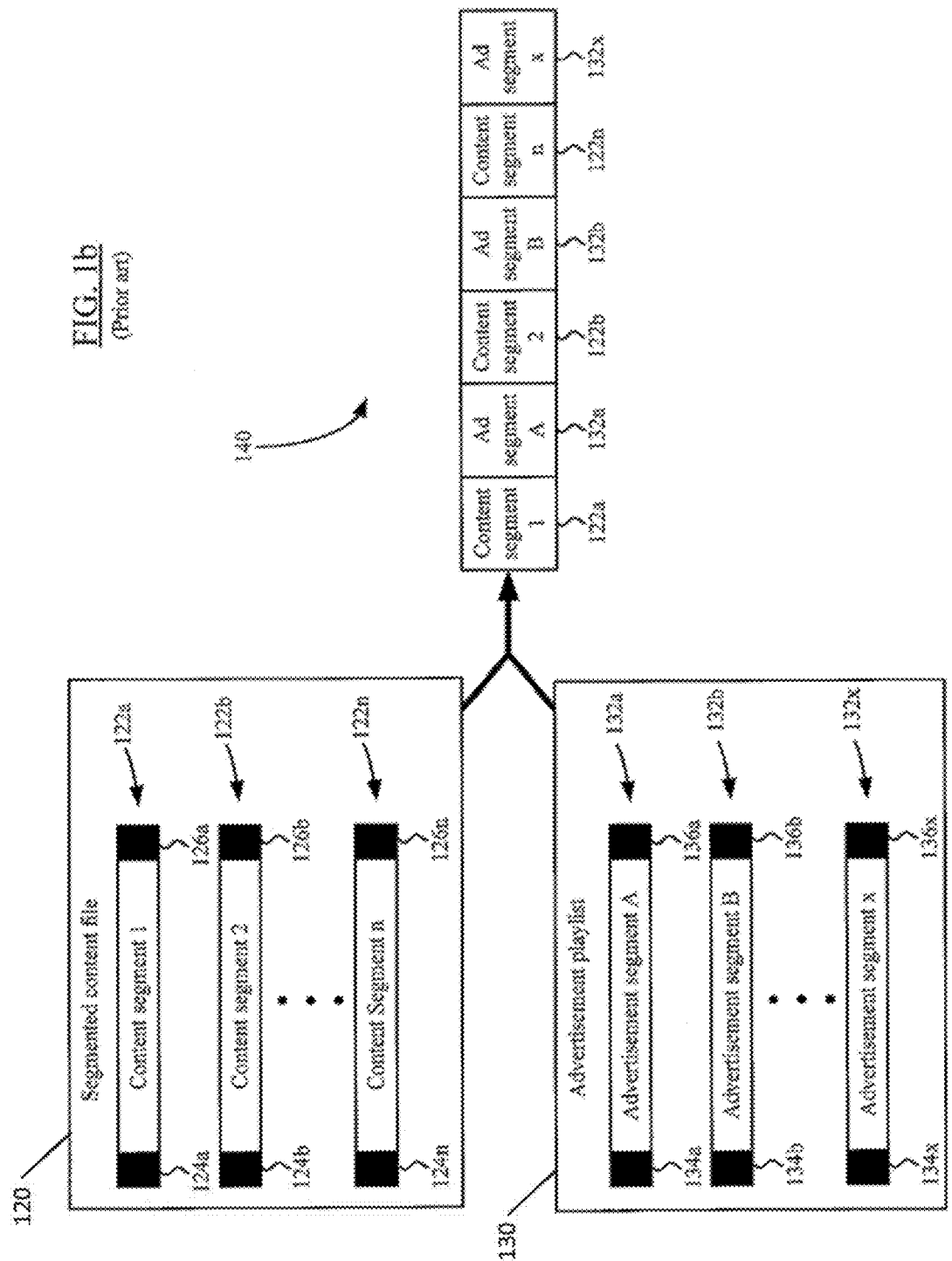

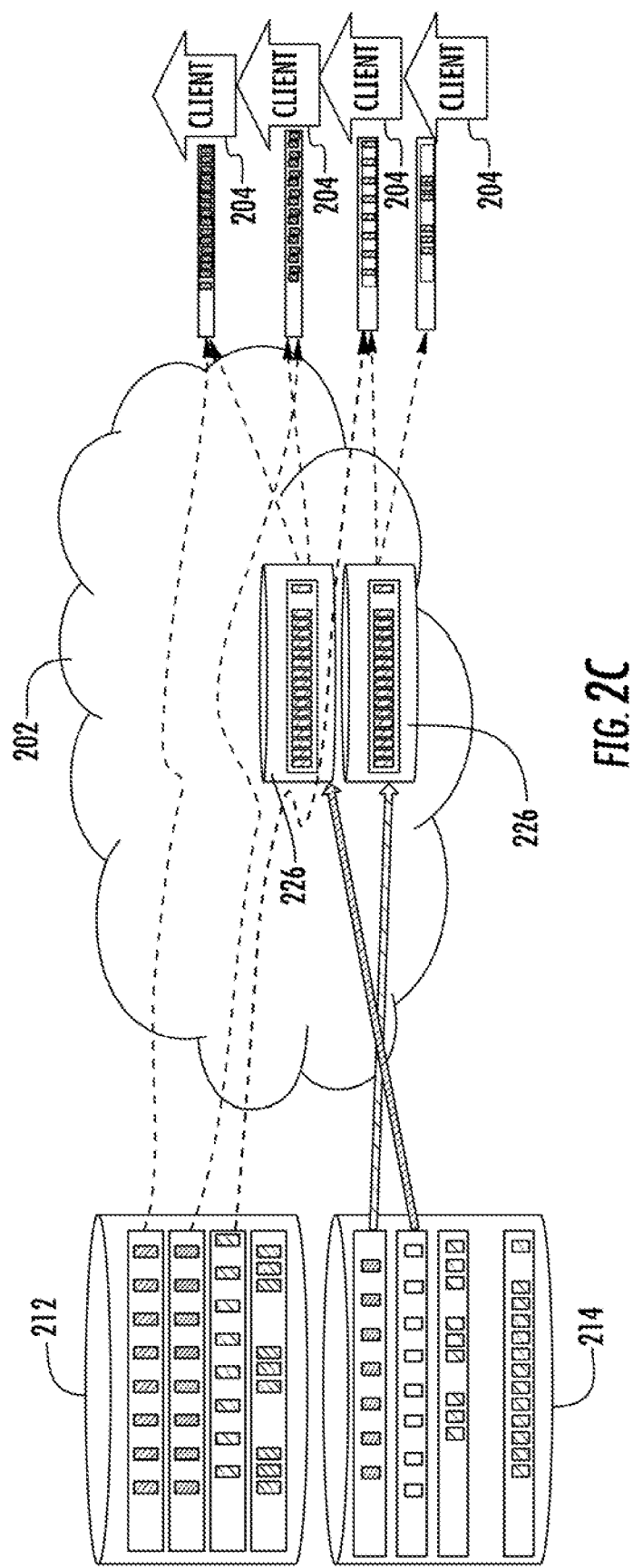

CLOUD-BASED DIGITAL CONTENT RECORDER APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital content over a network, and in one exemplary aspect to a network architecture for providing a cloud-based Digital Video Recorder (DVR) and compression storage functionality, including delivery to Internet Protocol (IP)-enabled client devices.

2. Description of Related Technology

Digital video recorders (DVRs) and personal video recorders (PVRs) are devices which record video content, in digital format, to a disk drive or other medium. The use of such devices is now ubiquitous, and they provide conveniences to TV viewers such as e.g., (i) allowing a user to record a program for later review, (ii) allowing a user to record every episode of a program for a period, and/or (iii) automatically recording programs for the user based on viewing habits and preferences. Further, the presentation of the recorded programming content can be manipulated by exercising rewind, pause, play, stop, and fast-forward functions (hereinafter referred to as "trick mode" functions) in such DVRs and PVRs.

Traditional DVRs are maintained and managed by an end user; e.g., subscriber of a cable or satellite network. While having utility, such premises recording devices have several disabilities, including the need for the user to possess the physical "box", the need to maintain the recording or storage device powered up at all times when recording may be required, as well as the finite storage volume limitations of the device (the latter which can effectively limit the user's selection for content).

Such disabilities have made providing virtual ownership of content delivery and virtual storage, i.e., storage in the "cloud", more appealing over time. One such cloud-based approach is the so-called "nPVR" or network PVR. An nPVR is a form of a PVR which can store content on a remote network device instead of a local storage medium such as a DVR. The nPVR allows the user to perform the analogous DVR functions through use of a network entity or process, rather than a local DVR at the user premises, thereby ostensibly relieving the user of the burdens of ownership and maintenance of a DVR unit, and providing greater digital data storage capacity.

Moreover, physically secure storage of content at the content distribution network as opposed to the premises may also provide certain assurances regarding physical security and unauthorized reproduction.

Numerous nPVR architectures exist. See, e.g., co-owned U.S. patent application Ser. No. 10/302,550, filed Nov. 22, 2002, issued as U.S. Pat. No. 7,073,189 on Jul. 4, 2006, and entitled "Program Guide and Reservation System for Network Based Digital Information and Entertainment Storage and Delivery System", incorporated by reference herein in its entirety, which discloses one exemplary network architecture and functionalities for implementing nPVR service. Generally, nPVR systems employ Video on-demand (VOD) or similar architecture of a content distribution network (CDN) to provide content storage and retrieval.

Similarly, so called "start-over" is a feature offered to some network users which allows the user to jump to the beginning of a program in progress without any preplanning or in-home recording devices (e.g., DVR). Start-over is enabled by a software upgrade to the existing video on-demand (VOD) platform, and to the installed base of digital set-top boxes. In other words, the start-over feature utilizes an nPVR system to maintain content which users may request, and delivers content in a manner similar to VOD. The typical start-over system instantaneously captures live television programming for immediate, on-demand viewing. Start-over functionality is the result of MSO-initiated nPVR storage of broadcast programs in real time. In other words, the MSO determines which programs will be start-over enabled, and stores this content as it is broadcast to an nPVR which is accessible by the various client devices utilizing a mechanism similar to VOD (discussed below).

When tuning to a start-over enabled show in progress, customers are alerted to the feature through an on-screen prompt. By pressing appropriate remote control buttons, the program is restarted from the beginning. Under one type of approach, start-over enabled programs may only be restarted within the shows' original telecast window (i.e., during the time window set for broadcasting the program), and may not be restarted after the show has finished broadcast. Thus, the start-over feature generally functions as an nPVR for pre-defined content (i.e., content on a start-over enabled channel) during a predefined period (i.e., the broadcast window). Co-owned, U.S. patent application Ser. No. 10/913,064, filed Aug. 6, 2004, and entitled "Technique for Delivering Programming Content Based on a Modified Network Personal Video Recorder Service", incorporated herein by reference in its entirety, discloses exemplary network architecture and functionalities for implementing start-over service within a content-based (e.g., cable) network.

As noted above, start-over services generally employ a VOD or similar architecture to provide content storage and retrieval. A typical prior art VOD architecture useful for prior art nPVR and start-over functionality is shown in FIG. 1*a*, and comprises sending content through various staging and segmenting functions, then on to a VOD server. At the staging and segmenting functions, the content is spliced on valid groups of pictures (GOP) boundaries, or I-frames (discussed below). The spliced content is then examined, and a reference data file is created to describe it.

As illustrated, audio/video content is received by the MSO. The MSO sends the content to a staging processor 102 adapted to "stage" content for transmission over the network. The staging processor 102 is an entity adapted to prepare content for segmenting and/or for transmission to a VOD server 105 for streaming to one or more users.

Content is prepared for transmission and/or segmenting by processing through various staging processes, or software applications adapted to run on the digital processor associated with the staging processor 102. The processes effected by the staging processor 102 include, inter alia, at least one segmenting process 104. The segmenting process 104 divides the content video feed on valid GOP boundaries, or I-frames.

Segmenting the video feed at the segmenting process 104 results in content which is segmented based on a schedule. The segmented content is then examined by a business management process (BMS) 107. The management process 107, inter alia, creates a data file regarding the segmented content. The data file gives metadata regarding the content and "points" to the segmented portions of the content on the disk.

Once the management process 107 has created a data file for the content, it is sent to a VOD server 105. As described in greater detail subsequently herein, the VOD server 105 stores the content and/or data on hard disks; the VOD server 105 streams the content from these disks as well. The VOD server 105 is also sent a playlist of advertisements.

The VOD server 105, therefore, will receive the segmented content as well as a file indicating where the various portions of the content are and in what order they should be arranged; the VOD server also receives advertisements for insertion into the segmented content.

FIG. 1*b* is illustrative of a simplified prior art segmented content file 120 and secondary content (e.g., advertisement) playlist 130. As noted above, the content is segmented according to a schedule thus resulting in any number (n) content segments 122. The advertisement playlist 130 comprises some number (x) of advertisement segments 132. The number x of advertisement segments 132 may be e.g., equal to the number n of content segments 122; alternatively, the number of advertisement segments 132 may be one more (n+1) or one less (n−1) than the number of content segments 122.

When a CPE 106 requests the content from the VOD server 105 via the network 101, the VOD server 105 utilizes the data file (not shown) created by the management process 107 to find the start 124 and end 126 points of the content segments 122, and the start 134 and end 136 points for the advertisement segments 132. The first content segment 122*a* is delivered to the user, and at its end point 126*a*, the VOD server 105 sends the first advertisement segment 132*a*. At the end point 136*a* of the first advertisement segment 132*a*, the VOD server 105 sends the second content segment 122*b*. At the end point 126*b* of the second content segment 122*b*, the second advertisement segment 132*b* is sent. This pattern continues until the last of the content segments 122*n* and/or the last of the advertisement segments 132*x* have been presented to the user. The user will receive a seamless content-plus-advertisement stream 140 comprised of the various segments 122*a*, 132*a*, 122*b*, 132*b* . . . 122*n*, 132*x* sent. It is recognized that the first segment sent to the user may comprise either the first advertisement or the first content segment, still utilizing the pattern outlined above.

In nPVR and start-over enabled systems, MSOs ingest a large quantities of content to the VOD servers for storage and streaming, so as to offer the nPVR or start-over features on a variety of channels and/or for a variety of programs. Doing so quickly becomes exceedingly expensive. As the number of users or subscribers of services such as nPVR and start-over within a content delivery network grows, so does the required network-side digital data storage and processing capacity. To enable each given subscriber or household to record even a relatively limited number of hours of programming requires many terabytes (TB) of storage, which can be quite expensive to both initially procure and maintain.

Further, given that start-over capabilities are made available on a channel-by-channel basis, a large portion of the content stored and available for streaming from the VOD server is often never requested, such as during times when there are fewer viewers (e.g., between 12 midnight and 6 am). Thus, in the present systems, even when content is not requested, it must still be sent to the VOD server as discussed above.

Additionally, as described in greater detail below, most content is received by the network operator (e.g., cable or satellite network MSO) in an encoding format (such as MPEG-2) that is not optimized in terms of storage or downstream bandwidth delivery requirements. Hence, maintenance of both the storage and delivery infrastructure necessary to keep pace with literally millions of users wanting to record several hours of programming per day via their nPVR or start-over service or equivalent becomes unduly burdensome and at some point, cost-inefficient.

To further complicate matters, each user may have differing use profiles or recording/playback requirements; e.g., one user may record a number of shows early in a given day, and watch at least a portion of the recorded content later that same day (e.g., after arriving home from work) or the following weekend, and never access that particular content again (instead opting to repeat the foregoing pattern the next day). However, another user may routinely "squirrel away" programming of interest, such as e.g., an old Sci-Fi movie buff who stores broadcast old movies for one or more later "movie marathons". Any number of different recording and usage patterns exist within the general subscriber population, thereby making a one-size-fits-all type solution to digital data storage and management untenable.

Mobility and Platform Heterogeneity

Another facet of current content delivery requirements relates to mobility; while prior content delivery paradigms (including nPVR and start-over) were largely centered on delivery to a fixed point or premises (i.e., a set-top box or satellite receiver in the user's home, to which one or more rendering devices such as televisions were connected) via purely a managed content distribution infrastructure, consumers currently demand the availability of digital content at any number of different locations, and via any number of different heterogeneous rendering platforms. For instance, a user may wish to cause recording of a given digital content element or program via a mobile user device such as a smartphone while away from their premises, and subsequently watch the recorded program via another modality (e.g., one with a larger screen, such as a wireless-enabled tablet, PC or Smart TV) at their premises. Or, while traveling, the user may wish to access previously recorded content on their tablet via e.g., a hotel's Wi-Fi or other broadband service.

Most any current personal electronic device or other rendering platform contains any number of video "players" (i.e., application software) which can render digitally encoded content received over, e.g., an Internet Protocol (IP) transport. Many so-called "cord cutters" are opting for delivery of digital content entirely via such transports; i.e., Internet-based content delivery services, whether free or for pay, such as Netflix, Hulu, and the like.

However, such Internet-based delivery paradigms can suffer several disabilities, including for example unreliable content delivery and rendering due to, inter alia, lack of Quality-of-Service (QoS) requirements associated with a typical broadband service provider. Moreover, availability of certain types of content (e.g., live sporting events, certain first-run movies, etc.) may be limited in such contexts. Hence, while the "cord cutting" model is on its face somewhat appealing, it is not optimized in many regards.

Video Encoding and Compression

Encoding utilizes one or more forms of video compression in order to economize on storage space and transmission bandwidth. Without such video compression, digital video content can require extremely large amounts of data storage capacity, making it difficult or even impossible for the digital video content to be efficiently stored, transmitted, or viewed.

Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

As noted above, content often arrives from content sources at a content distribution network (CDN) in a digitally encoded format, such as MPEG-2. The MPEG-2 standard is ubiquitous and specifies, inter alia, methodologies for video and audio data compression and encoding. Specifically, in accordance with the MPEG-2 standard, video data is compressed based on a sequence of GOPs, made up of three types of picture frames: coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame. The GOP may represent additional frames by providing a much smaller block of digital data that indicates how small portions of the I-frame, referred to as macroblocks, move over time.

MPEG-2 achieves its compression by assuming that only small portions of an image change over time, making the representation of these additional frames compact. Although GOPs have no relationship between themselves, the frames within a GOP have a specific relationship which builds off the initial I-frame.

In a traditional content delivery scheme (e.g., for a cable network), the compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams, which utilize MPEG-2 encoded video content as their payload.

However, despite its ubiquity, MPEG-2 has salient limitations, especially relating to transmission bandwidth and storage. The more recently developed H.264 video coding standard is able to compress video much more efficiently than earlier video coding standards, including MPEG-2. H.264 is also known as MPEG-4 Part 10 and Advanced Video Coding (AVC). H.264 exhibits a combination of new techniques and increased degrees of freedom in using existing techniques. Among the new techniques defined in H.264 are 4×4 discrete cosine transform (DCT), multi-frame prediction, context adaptive variable length coding (CAVLC), SI/SP frames, and context-adaptive binary arithmetic coding (CABAC). The increased degrees of freedom come about by allowing multiple reference frames for prediction and greater macroblock flexibility. These features add to the coding efficiency (at the cost of increased encoding and decoding complexity in terms of logic, memory, and number of operations). Notably, the same content encoded within H.264 can be transmitted with only roughly half (50%) of the requisite bandwidth of a corresponding MPEG-2 encoding, thereby providing great economies in terms of CDN infrastructure and content storage.

Digital encoding also advantageously lends itself to transcoding of content. As used herein, the term "transcoding" refers generally to the process of changing content from one encoding to another. This may be accomplished for example by decoding the encoded content, and then re-encoding this into the target format. Transcoding can also accomplish the encoding of content to a lower bitrate without changing video formats, a process that is known as transrating.

Transcoding is used in many areas of content adaptation; however, it is commonly employed in the area of mobile devices such as smartphones, tablets, and the like. In such mobile applications, transcoding is essential due to the diversity of mobile devices. This diversity effectively requires an intermediate state of content adaptation, so as to ensure that the source content will adequately present or "render" on the target mobile device.

It should be noted that there is a price to pay for such transcoding; however, compression artifacts are typically cumulative, and therefore transcoding between "lossy" codecs (which include both MPEG-2 and H.264/AVC) causes a progressive loss of quality with each successive iteration. It is therefore desirable to minimize the number of transcodes of content; e.g., obtain a copy of the content in a lossless format, and then encode directly from the lossless source file to the "target" lossy format(s) required, thereby causing the minimum degradation, or only transcode once if possible. Transmission of lossless format data over a CDN (especially to wireless-enabled mobile devices) is simply untenable under present technology due to bandwidth limitations.

Delivery of encoded content may also utilize a technology known as "adaptive bitrate streaming". Adaptive bitrate (ABR) streaming is a technique to distribute program content over a large distributed network in an efficient manner based on, inter alia, available streaming capacity. In one implementation, multiple bitrates of a particular piece of content are available to stream to a viewer, and the selection of the bitrate is based on current network conditions. This means that when there is greater bandwidth availability, a larger bitrate version of the content may be selected. If available bandwidth narrows, a lower bitrate (i.e., smaller) version of the content may be selected to provide a seamless user experience. Typical ABR streaming solutions include e.g., DASH (dynamic adaptive streaming over HTTP), Microsoft Smooth Streaming, and Adobe HTTP Dynamic Streaming, which are further particularly adapted for HTTP-based environments such as Internet delivery. ABR streaming protocols are typically codec-agnostic (e.g., may use content encoded in e.g., H.264, MPEG-2, or others), and are notably distinguishable from such underlying encoding.

Based on the foregoing, there is a salient need for improved apparatus and methods of recording and delivering digitally rendered content to a large number of users associated with a content delivery network. Such improved apparatus and methods would ideally allow the users a great degree of freedom in the recording and delivery of content available over the network, including: (i) the types of devices which could receive the content (including without being tied to a set-top box); (ii) the ability to receive the content at various physical locations via various transport modalities; and (iii) the ability to easily cause recording and retrieval of content. Likewise, such improved apparatus and methods would enable the network operator to store large volumes of data in "the cloud" in a space- and cost-efficient manner, and also deliver respective content to many different individual network users simultaneously in a bandwidth-efficient manner, while preserving suitable rendering quality and temporal aspects (i.e., avoiding "stutters" or other non-linearities in service commonly associated with e.g., Internet-based delivery models).

SUMMARY

The present disclosure addresses the foregoing needs by providing, inter alia, methods and apparatus for efficient network or "cloud" storage of digital content and delivery to users.

In one aspect of the disclosure, a method of managing content within a content delivery network for at least one of a plurality of users of the network is disclosed. In one embodiment, the method includes: receiving at an entity of the network a request to record content from a client device associated with the at least one of the plurality of users of the network; based at least in part on the request, causing at least a first portion of the content to be stored on a first storage device of the network, the at least first portion of the content stored at a storage location specifically associated with the at least one user; and causing at least a second portion of the content to be stored at a storage location not specific to the at least one user.

In one variant, the method further includes: subsequent to the causing the at least first and second portions to be stored, receiving a request from the at least one user to access the content; and based at least on the request to access the content, assembling the content from both the storage location specifically associated with the at least one user and the storage location not specific to the at least one user.

In one implementation, the assembling the content comprises assembling the content from both: (i) the storage location specifically associated with the at least one user, and the storage location not specific to the at least one user; and (ii) a storage location associated with a different one of the plurality of users.

In another aspect, a method of operating a content delivery network having a plurality of users is disclosed. In one embodiment, the method includes: receiving at least one content element from a content source; receiving a plurality of requests from respective ones of the plurality of users to record the at least one content element; based at least on the plurality of requests, recording respective ones of first versions of the at least one content element, each of the respective ones of the versions accessible only by the respective one of the plurality of users; and after expiration of a period of time, storing respective second versions of the at least one content element, the second versions being compressed with respect to the first versions thereof, and at least a portion of each of the second versions accessible by one or more users other than the respective user associated with the respective second version.

In a further aspect, a content delivery network architecture configured to service a plurality of users is disclosed. In one embodiment, the architecture includes: a first storage repository configured to store ingested content elements obtained from a content source; a second storage repository in data communication with the first storage repository and configured to provide storage of at least first portions of each of the ingested content elements, respective ones of the at least first portions being uniquely associated with respective ones of the plurality of users; and a third storage repository in data communication with at least the first data storage repository and configured to provide storage of at least second portions of each of the ingested content elements, the at least second portions not being uniquely associated with any of the users.

In one variant, the architecture achieves storage compression at least through configuration to, in response to a content element access request from a respective ones of the users, utilize both a respective unique first portion of the content element from the first storage repository and a second portion of the content element from the second data repository to service the request.

In another aspect, a content delivery network apparatus configured to service content requests from a plurality of users is disclosed. In one embodiment, the apparatus includes: at least one data interface for data communication; processing apparatus in data communication with the at least one interface; storage apparatus in data communication with the processing apparatus and comprising at least one computer program. In one variant, the at least one program is configured to, when executed on the processing apparatus: store within a first storage repository in data communication with the interface, the content element in its entirety, the first repository configured to store ingested content elements obtained from a content source and comprising a plurality of storage locations uniquely associated with respective ones of a plurality of the users; thereafter, upon expiry of a prescribed period of time after receipt of a recording request relating to a content element, the request originated by one of the plurality of users, access the first storage repository to retrieve the content element, the retrieved content element comprising a plurality of segments; utilize an allocation algorithm to allocate the plurality of segments of the content element into at least first and second portions each having some of the plurality of segments, the at least first portion being uniquely associated with the user, and the at least second portion being unassociated with any of the plurality of users; store the at least first portion within a second storage repository in data communication with the interface, the first repository comprising a plurality of storage locations uniquely associated with respective ones of a plurality of the users; and store the at least second portion within a second storage repository in data communication with the interface.

In yet another aspect, a method of managing content within a content delivery network for at least one of a plurality of users of the network is disclosed. In one embodiment, the method includes: receiving at an entity of the network a request to record content from a client device associated with the at least one of the plurality of users of the network; and based at least in part on the request: causing a first portion of the content to be stored on a first storage device of the network, the first portion of the content stored at a storage location specifically associated with the at least one user, the first storage device located at a first portion of the network; and causing at least one representation of a second portion of the content to be stored on a second storage device of the network, the at least one representation comprising a complement of the first portion and being stored at a storage location not specific to the at least one user, the second storage device located at a second portion of the network different from the first and providing reduced content transport cost as compared to the first portion of the network.

In another embodiment, the method includes: receiving at an entity of the network a request to access recorded content, the request initiated from a client device associated with the at least one of the plurality of users; and based at least in part on the request: causing a first portion of the content to be accessed from a first storage device of the network, the first portion of the content stored at a storage location specifically associated with the at least one user; delivering the accessed first portion of the content to the client device via a first transport; causing at least one representation of a second portion of the content to be accessed from a second storage device, the second portion stored at a storage location not specific to the at least one user; and delivering the accessed second portion of the content to the client device via a second transport distinct from the first.

In yet another embodiment, the method includes: receiving at an entity of the network a request to record content from a client device associated with the at least one of the plurality of users of the network; and based at least in part on the request: causing a first portion of the content to be stored on a first storage device of the network, the first portion of the content stored at a storage location specifically associated with the at least one user; and causing multiple representations of a second portion of the content to be stored at a storage location not specific to the at least one user, the second portion being a complement to the first portion. In one variant of the method, the storage of the first portion and the multiple representations of the second portion enables creation of a plurality of content-identical yet physically unique versions of the content.

In another aspect of the disclosure, a server apparatus for processing and delivering recorded content is described. In one embodiment, the server apparatus includes: a first interface configured to communicate with a network; a storage apparatus; and a processor apparatus configured to execute at least one computer program, the at least one computer program comprising a plurality of instructions.

In a further aspect, a non-transitory computer readable apparatus is disclosed. In one embodiment, the apparatus includes a storage medium having one or more computer programs disposed thereon.

In yet another aspect, a client device is disclosed. In one embodiment, the client device comprises a wireless-enabled mobile device capable of rendering video and audio content thereon according to a prescribed encoding and protection format (e.g., MPEG-4/AVC, and DRM), and further includes an application computer program configured to enable access to cloud-based content via a network interface to a network server managing streaming of the cloud-based content.

These and other aspects shall become apparent when considered in light of the disclosure provided herein.

BRIEF DESCRIPTION OF THE DRAWINGS

FIG. 1b is a functional block diagram illustrating an exemplary prior art content and advertisement stream assembly.

FIG. 2C is a functional block diagram illustrating an exemplary process and architecture for "CDN assisted" delivery of compressed (unique and shared) content using one or more edge caches associated with a content delivery network.

Figure 1A:
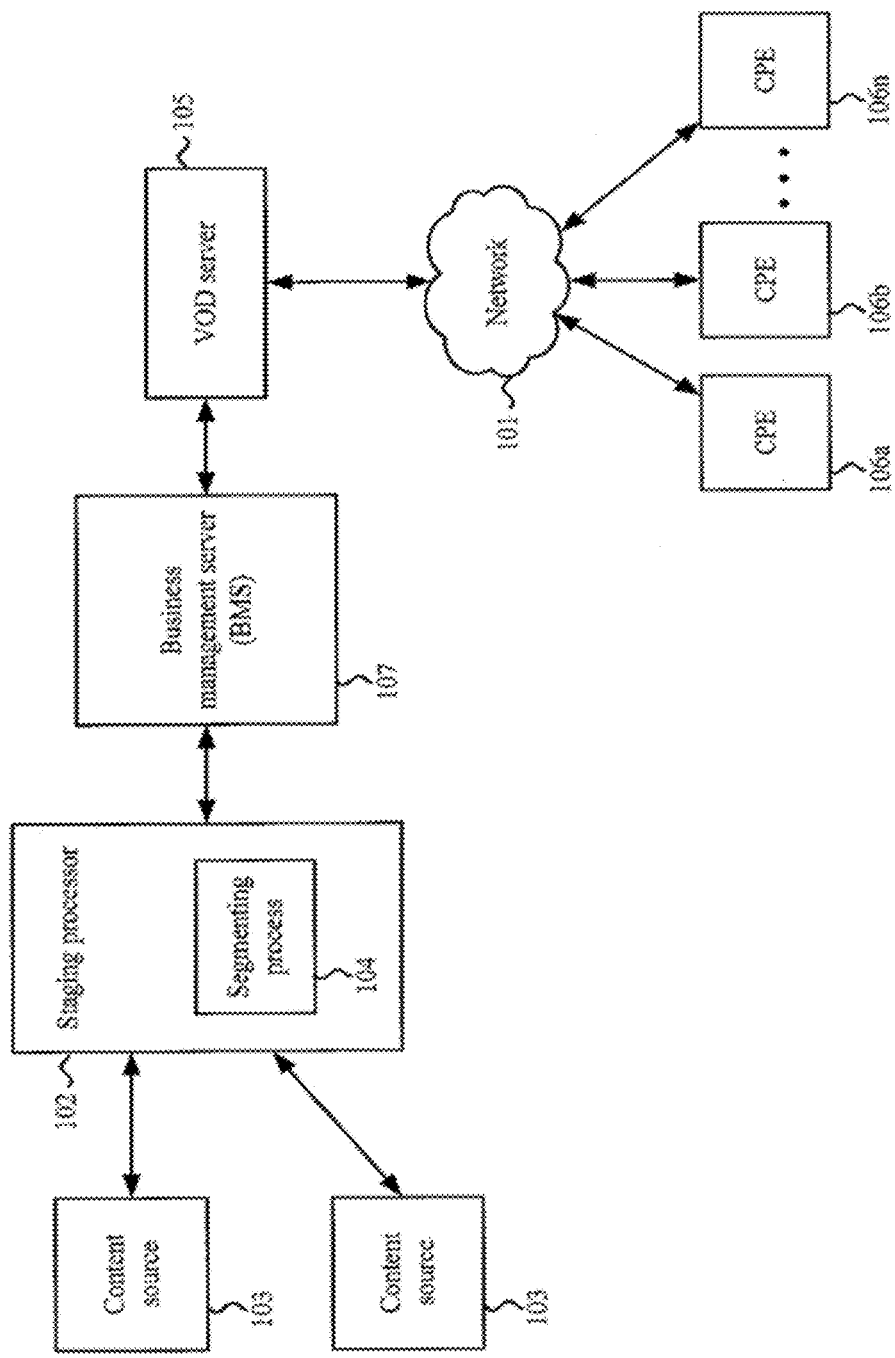
FIG. 1a is a functional block diagram illustrating an exemplary prior art VOD architecture useful for providing nPVR functionality.

All figures © Copyright 2016 Time Warner Cable Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, Smart TVs, USB-based devices, Internet-based content streaming devices, and vehicle infotainment or navigation systems.

As used herein, the term "codec" refers to a video, audio, or other data coding and/or decoding algorithm, process or apparatus including, without limitation, those of the MPEG (e.g., MPEG-1, MPEG-2, MPEG-4, AVC/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "digital video recorder" refers generally to any type of recording mechanism and/or software environment, located in the headend, the user premises or anywhere else, whereby content sent over a network can be recorded and selectively recalled. Such recorder may be dedicated in nature, or part of a non-dedicated or multi-function system.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or 00B, cable modem, etc.), Wi-Fi, LTE/LTE-A, or WiMAX (802.16).

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), solid-state storage devices (SSSDs), or any other devices or media capable of storing content or other information, whether local, virtual or cloud-based.

As used herein, the term "wireless" means any wireless signal, data, communication, or other interface including without limitation Wi-Fi (e.g., IEEE Std. 802.11a/bg/n/v/ac, or Wi-Fi Direct), Bluetooth, 3G (3GPP/3GPP2), HSDPA/HSUPA. TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, the present disclosure provides, inter alia, improved apparatus and methods for the storage and delivery of recorded content stored at a network storage location (i.e., in the "cloud") and delivered over a network (hereinafter referred to as "cloud DVR" or "cDVR"). The storage and delivery of cDVR content in the present disclosure includes, inter alia, both storage and delivery of user-initiated cDVR events (i.e., instances wherein a user requests to have content recorded to a cloud-based digital video recorder), as well as real-time MSO-initiated cDVR events (i.e., instances wherein the MSO determines which content will be recorded, in real time, to a cloud-based digital video recorder). The improved apparatus and methods disclosed herein advantageously provide a high degree of platform heterogeneity and mobility (i.e., delivery of content to various different types of user client devices, and at differing physical locations), while also providing significant economies to the network operator or service provider in terms of efficient data storage and transmission.

Moreover, the ability to cache or preposition portions of a given content element in various locations throughout the content distribution network (including for use with other portions of the same content element which are not stored within the content distribution network) is provided.

In one embodiment, the improved apparatus of the present disclosure comprises one or more entities adapted to accomplish various content processing operations; e.g., a cDVR server adapted to utilize a compression storage system that significantly reduces virtual storage requirements. In one implementation, content assets are compressed in the aforementioned compression storage system after a threshold time duration is reached (e.g., 72 hours after receipt of an initial recording request from a user). The aforementioned compression storage system and/or cDVR server utilizes a randomized sequence allocation/assignment with numeric complements adapted to create a large number of unique combinations of the stored content elements, and stream them to the client device(s) of network users or households via a unique path. The improved apparatus of the invention advantageously obviates excessive (and often unused) content storage, and facilitates pre-streaming processing within the cDVR system.

Moreover, various implementations of the disclosure utilize two distinct types of compression; i.e., "virtual" spatial or storage compression, and encoding ("lossy") compression; advanced adaptive bitrate (ABR) streaming techniques are also optionally employed to further enhance storage and delivery efficiency and flexibility.

In another embodiment, the apparatus of the invention also comprises one or more content databases adapted to facilitate cDVR content access across one or more regions of a broadcast network. In one variant, the content databases comprise a unique private storage and a cached shared library, each of which are used together to create significant network efficiencies and combinational uniqueness. The content databases can each be disposed within and/or outside the content distribution network; e.g., one at the core of the network, and one at one or more edge caches, etc.

The improved methods and apparatus of the invention provide other significant benefits including: (i) reduced costs associated with storage and streaming of content (i.e., instead of having to store large quantities of content at, e.g., a VOD server, the cDVR server will compress and store content until requested); (ii) enablement of pre-streaming processing steps to ensure quality of content streamed to users (e.g., transcoding/transrating, and selective secondary content insertion or modification); and (iii) significant improvements in reliability and delivered video quality.

Moreover, the ability to create a large number of "physically unique" versions of a given content element may be used to address or satisfy copyright concerns regarding non-duplication or reproduction of content elements by users.

Detailed Description of Exemplary Embodiments

Exemplary embodiments of the apparatus and methods of the present disclosure are now described in detail. While these exemplary embodiments are described in the context of a managed network (e.g., hybrid fiber coax (HFC) cable) architecture having a multiple systems operator (MSO), digital networking capability, high-speed data (HSD) and IP delivery capability, and a plurality of client devices, the general principles and advantages of the disclosure may be extended to other types of networks and architectures that are configured to deliver digital media data (e.g., text, video, and/or audio), whether managed or unmanaged. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

In addition, while the disclosure refers at numerous points to one or more Internet Protocol Television (IPTV) embodiments, the principles of the disclosure are contemplated in other applications, such as video services (e.g., network DVR, second screen applications, cloud-based digital navigators, OnDemand or over-the-top (OTT) content (e.g., Netflix®, Hulu®, virtual MSO services, etc.)), visual/social media applications or communications (e.g., Skype®, Facetime®, etc), or cloud computing/storage/streaming services. All such embodiments are considered within the scope of the present disclosure.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Cloud Digital Video Recording Architecture—

Figure 2:
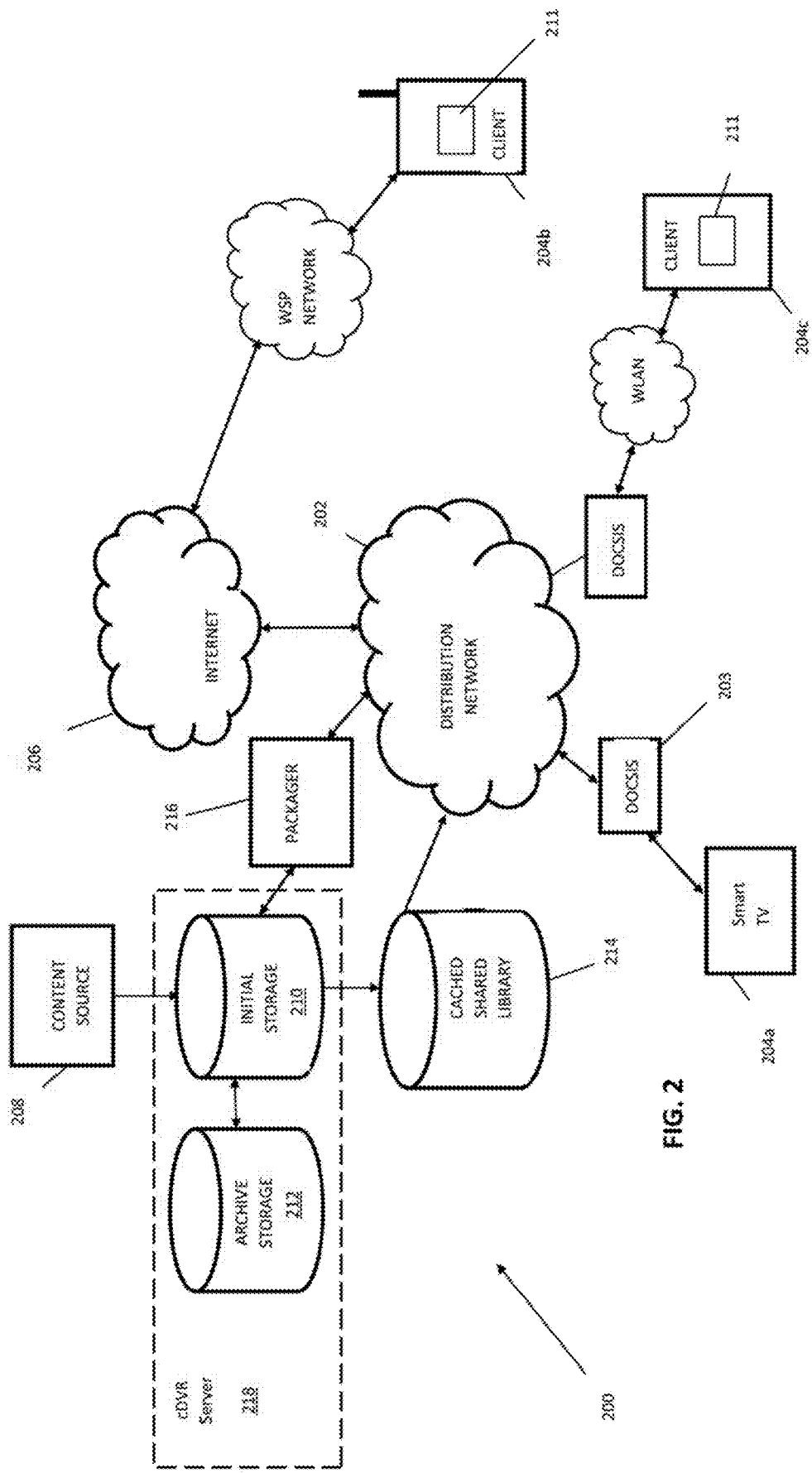
FIG. 2 is a functional block diagram illustrating an exemplary network architecture for storing and delivering content in a cDVR model according to one embodiment of the present disclosure.

Referring now to FIG. 2, an exemplary embodiment of the generalized cloud digital video recorder (cDVR) architecture 200 according to the present disclosure is described in detail. It is noted that the apparatus, systems and methods described below are useful in providing storage and access to user-initiated cDVR content, as well as in providing storage and access to MSO-initiated cDVR content. Storage and access of MSO-initiated cDVR content enables, inter alia, a user to access content simultaneous to the content's broadcast, and to start the program over from the beginning after it has begun without the user having previously recorded the content (e.g., "start-over" functionality).

As shown in FIG. 2, the exemplary configuration of the cDVR architecture 200 generally comprises a distribution network (DN) 202 that is in communication with one or more client devices (or premises, such as households) 204, as well as being in communication with an internetwork 206 such as e.g., the Internet. While described primarily in the context of Internet Protocol (IP) network transport, it will be recognized that the principles of the disclosure may be extended to other transport modalities and network paradigms.

The requesting client device 204a-c may include home gateway devices and/or media client devices. In one embodiment, the media client device is a portable device such as a wireless-enabled tablet computer or smartphone. Alternatively, the client device may include a Smart TV or the like. The present disclosure also contemplates a household or person using two or more client devices and therefore may have access to two or more independent communications paths to the content server (e.g., cDVR server 218). For example, a user may have access to a Smart TV 204a connected to a router and cable modem 203, and a tablet 204c connected to the cable modem via a wireless communications network such as a wireless LAN (e.g., Wi-Fi), as well as a smartphone 204b interfacing with a wireless service provider (WSP) network such as via an LTE or LTE-A interface, the WSP network in data communication with the Internet 206 (or directly to the distribution network 202, not shown).

In one variant, the user IP-enabled client devices 204*a-c* may also include an MSO-authored application program ("app") 211 operative thereon to interface with the MSO cDVR server (or other entity of the MSO network) so as to facilitate various user functions such as program guides, browsing, recording, and even playback/rendering. The user may also make use of a streaming player device if desired, such as a Roku or similar, to receive OTT (over-the-top) streaming of content from the MSO and/or other streaming sources such as e.g., Hulu.

As shown, the architecture of FIG. 2 comprises at least one content source 208 providing content to the MSO network. Various third party and/or internal (i.e., MSO owned or operated) content sources 208 may provide content to the MSO network. For example, content may be received from a local, regional, or network content library as discussed in co-owned U.S. patent application Ser. No. 12/841,906 (now U.S. Pat. No. 8,997,136) entitled "Apparatus and methods for packetized content delivery over a bandwidth-efficient network", incorporated herein by reference in its entirety. Alternatively, content may be received from linear analog or digital feeds, as well as various third party content sources. In yet another embodiment, content may be received from subscriber and/or non-subscriber devices (e.g., a PC or smartphone-originated user made video which is uploaded, such as to an Internet or MSO-operated social media portal).

The received content is presented to various network entities. Specifically, at least one mechanism is established for providing content directly to the user in accordance with a schedule (not shown); such mechanism is well known in the art and thus will not be discussed in further detail herein.

Content which is recorded, either by a user-initiated or an MSO-initiated cDVR request, is initially input into a first storage entity 210. In one embodiment, the content is provided to storage 210 as an uncompressed individual asset (e.g., copy). An uncompressed individual asset may be stored for each client or household 204*a-c* that requests a recording. In a further embodiment, the uncompressed individual content assets may be pre-processed, thereby comprising a plurality of segments. As users have the ability to select a different start and end time for each asset requested to be recorded, not all segments will necessarily be recorded for all users.

In one embodiment, storage 210 may employ one or more "rolling buffers" which constantly record one or more incoming audio or video programs. In accordance with this embodiment, the rolling buffer has a prescribed depth; once the buffer has been filled, the oldest data stored therein is overwritten. The depth of the buffer may be selected e.g., as a function of the number of overlapping payload data segments that are to be kept in anticipation of an expected an amount of skew in the system. In another embodiment, the storage entity 210 may additionally comprise a "fan-out" or filtering mechanism which facilitates the selective storage of content from the initial storage 210. For example, if a rolling buffer is set for five hours, when the maximum duration has been reached, content at the beginning of the buffer may be deleted in order to save new content; however, this logic is only applied in cases where at least one user has specifically requested recordation of a particular content element. So, for example all of 100 channels may be at least transiently stored in the rolling buffer for a prescribed period, yet maybe only 25 of those 100 channels are "persistently" recorded in respective unique folders associated with respective requesting users based on the existence of requests from those users to record. This mechanism advantageously reduces required storage space, since only those program elements in which one or more users has expressed interest in recording are in fact recorded (for any duration beyond the depth of the rolling buffer). The "fan-out" process is a subset of the process of storing recorded content. For example, in the event that N distinct users initiate a recording of a particular video program, the "fan-out" process optimizes the allocation of the N recordings across the multitude of hard-drives within the storage system of the cDVR server 218.

In some embodiments, the uncompressed assets delivered from the distribution network 202 during e.g., a live broadcast may only be kept until the user changes the data source (e.g., television channel), or another event occurs, such as the user turning off their client device 204.

Furthermore, the storage entity 210 may comprise a plurality of private storage locations (e.g., private folders) unique to each household or client 204*a-c* such that all assets requested to be recorded by each household or client 204*a-c* may be stored in one or more of the private locations. Such folders may even be sub-partitioned by e.g., particular users and/or client devices associated with the account if desired.

The network architecture 200 of FIG. 2 further includes one or more packaging processes or entities 216 in data communication with the cDVR server 218. As described in greater detail below, the exemplary packager performs a number of different functions, including: (i) transcoding of content; (ii) segmentation and associated processing; (iii) digital rights management (DRM) data processing and insertion; and (iv) secondary content (e.g., advertisement) insertion. The "packaged" streams are then distributed to the requesting users on an individual basis; i.e., per requesting device IP address via one or more routers and other network infrastructure (e.g., HSD/DOCSIS modem) of the distribution network 202. Hence, each individual stream may be individually controlled (including trick-mode functionality), individually tailored with inserted advertisements, individually tailored DRM, and even individually routed through the network infrastructure, including to multiple distinct clients within the same premises or household, thereby enabling multiple users within that premises to independently watch different recorded program elements.

Figure 2A:
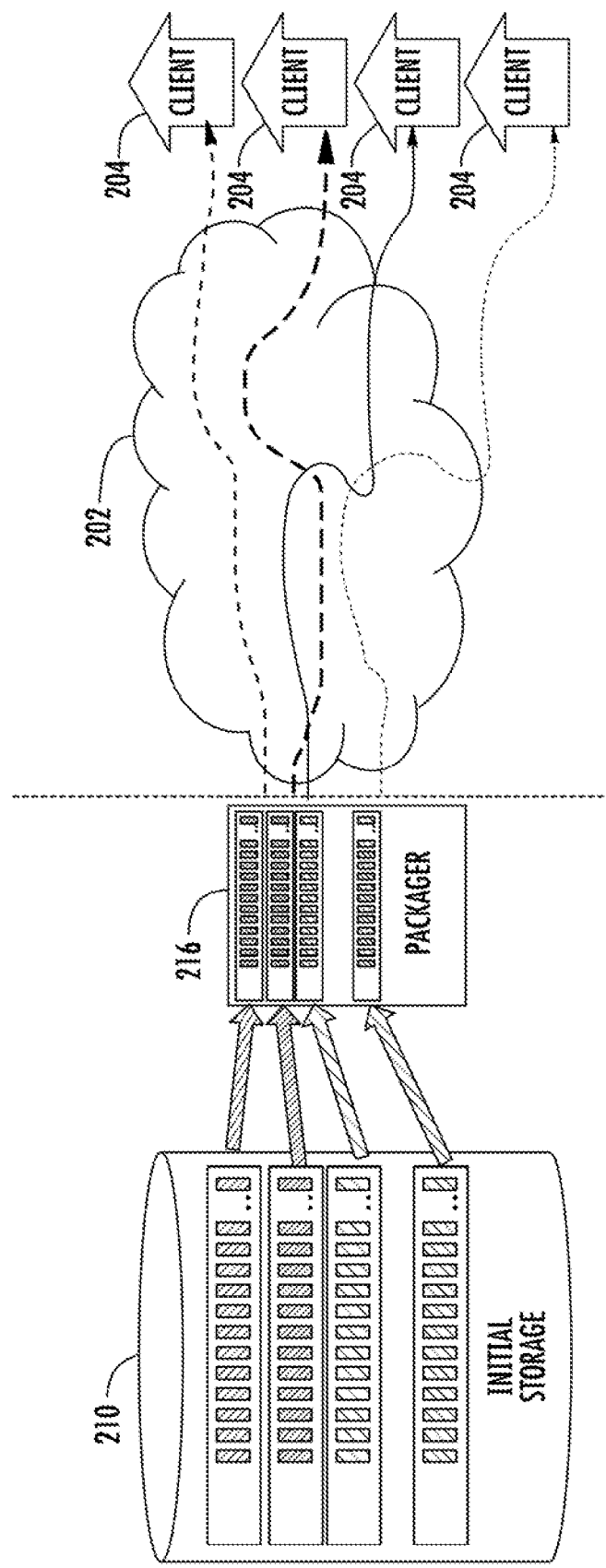
FIG. 2A is a functional block diagram illustrating an exemplary process for delivery of uncompressed (unique) content in the context of the architecture of FIG. 2.

FIG. 2A illustrates, in the context of the architecture 200 of FIG. 2, one exemplary embodiment of the process for providing cDVR capabilities when a request for playback of the recorded content is received before one or more threshold criteria (e.g., within a certain period of time after recordation is instigated; discussed elsewhere herein). In this embodiment, upon a user-initiated request for playback, the uncompressed individual asset is sent from the unique folder associated with the requester from storage 210 to the packager 216.

In addition to segmentation, DRM management, and ad insertion, the packager 216 may also transcode/transrate/transcrypt content before sending it through the DN 202 (and possibly the internetwork 206) to the client(s) or household. However, while the transcoding/transrating/transcrypting functionalities are shown as being integrated into a single apparatus (i.e., packager 216), in another embodiment, the functionalities may be integrated into separate apparatus, such as a transcoder module, transrater module, and/or transcrypter module (not shown). Thus, each of the cDVR server 218, encoder, encryptor, and packaging processes may be housed in separate server apparatuses, may comprise different processes running on a single server apparatus, or may comprise any number of distributed applications with functionality across any number of apparatus. Each server apparatus may include memory and storage, one or more processors, and interfaces to connect to other components/networks, as will be appreciated by those of ordinary skill in the art given the present disclosure.

In one exemplary embodiment, the packager 216 acts as a transcoding entity and encodes the uncompressed individual copy of content from the storage entity 210 into at least one encoding format (e.g., transcodes content from one encoding format such as MPEG-2 to at least one other format such as MPEG-4 AVC/H.264), whether after retrieval from initial storage in the storage entity 201 or prior to such storage. Transcoding prior to storage may be used to save storage space (e.g., going from MPEG-2 to MPEG-4 AVC is roughly half), yet also reduces flexibility in that if a subsequent format (other than MPEG-4 AVC in the example) is required by the client due to e.g., configuration or player limitations, a second transcode operation will be required, which consumes processing and may further reduce quality of the content as previously discussed (i.e., due to "lossiness").

In one particular implementation, the packager 216 streams the retrieved content via adaptive bitrate (ABR) streaming. "Adaptive bitrate (ABR) streaming" refers to streaming multimedia over computer networks such that content thereof may be encoded into multiple bitrates. Depending on client capacity and available bandwidth, several encoded content segments of varying bit rates may be sent to a client device. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®. As noted above, ABR is typically agnostic to the underlying codec, and hence can be used as an "overlay" of sorts to the transcoding referenced above (e.g., ABR may be applied to the MPEG-4 AVC-encoded content during/after its transcoding from MPEG-2 to AVC). In one implementation, multiple bit rate streams are output by the packager 216, e.g., and the stream that best utilizes the viewer's device and current bandwidth constraints (the latter which may be provided to the packager from another network process or source) is used to provide an optimal playback experience. The optimization occurs via a process or application running at the packager 216 (including optionally negotiation with the target client as to its particular capabilities).

In another variant, the content is encoded into a plurality of heterogeneous encodings that correspond to a respective plurality of one or more device types, codecs, resolutions, file formats, audio encodings, bit rates, etc. The content may be encoded in a variety of formats (both audio and video), bit rates, resolutions, which are each playable on a variety of devices, so as to enable a wide variety of user devices to play a certain piece of content. Accordingly, a network operator selects to have the packager 216 encode the content into multiple formats for use on the variety of players.

Parameters used by the packager 216 to encode the content may include: (i) whether the output streams should be encoded into separate video and audio only tracks, or video tracks with audio included, (ii) an appropriate key frame period, (iii) a frame rate, (iv) segmentation duration, (v) video resolutions, (vi) video bitrate, (vii) audio bit rate (where necessary), (viii) audio sample rate, (ix) a number of audio channels, (x) aspect ratio, (xi) video codec, (xii) specific device profiles, (xiii) audio volume, (xiv) file type and extension, and (xv) standard specific encoding profiles. Standard specific encoding profiles are associated with various codecs such as e.g., H.264, which includes different standard encoding profiles for baseline, main, and high encoding. This might be useful for example in a case where the delivery channel to the target device (e.g., a laptop, handheld, etc.) is bandwidth-constrained, since the H.264 encoding will typically require a lower bitrate for the same content. Similarly, if the target device has only an H.264 codec, the content must be transcoded. Any multitude of reasons may exist for transcoding content before delivery. Additionally, the packager 216 may utilize information used for cutting out other resolutions/aspect ratios from a higher resolution/different aspect ratio file. For example, the packager 216 may center-punch a standard definition (SD) image or video from a high definition (HD) source. Similarly, an HD image or video may be center punched from a 4K, 8K, 16K source.

Output streams may be separate files (for example MPEG 4 transport stream (.ts) files) delivered according to a manifest, or in a further embodiment of the present disclosure, all of the streams (i.e., streams 212) may be presented in a single "super" file. Having a single comprehensive file comprising multiple streams may lower the number of files the MSO network infrastructure must manage.

The packager 216 may encode output streams with audio tracks (e.g., AC3 audio). Different encoding formats and bit rates may be selected based on the requirements of the stream, end user (client) equipment, and the protocols and formats used by the CDN 202.

The packager 216 may also transrate the content (optionally independent of whether or not transcoding is performed, or alternatively as part of the transcoding function) in order to adjust the bitrate. Transrating may include for example changing or altering content from one bitrate, GOP size, resolution, etc. to a different bitrate, GOP size, resolution, etc.

Additionally (or alternatively), the packager 216 may provide transcryption functionality; e.g., the encoded output streams are translated between one encryption domain to another by the packager 216 via an encryption algorithm (e.g., AES, DES, public key encryption, etc.). For example, transcryption may be used to move between encryption formats used by different content protection or conditional access (CA) systems (e.g., from an MSO's indigenous DRM scheme to another scheme such as Windows Media DRM ("WMDRM") or Digital Transmission Content Protection ("DTCP") on a subscriber PC), or provide a transitory encryption for the digital content while it is being transferred between different systems and/or components. In this fashion, content or other data within the MSO security or CA environment can "jump the fence" to DRM or other security environments that may be more widely deployed on IP-based devices for example. This is particularly useful for the IP-based delivery targets such as those described with respect to the figures presented herein.

Figure 2B:
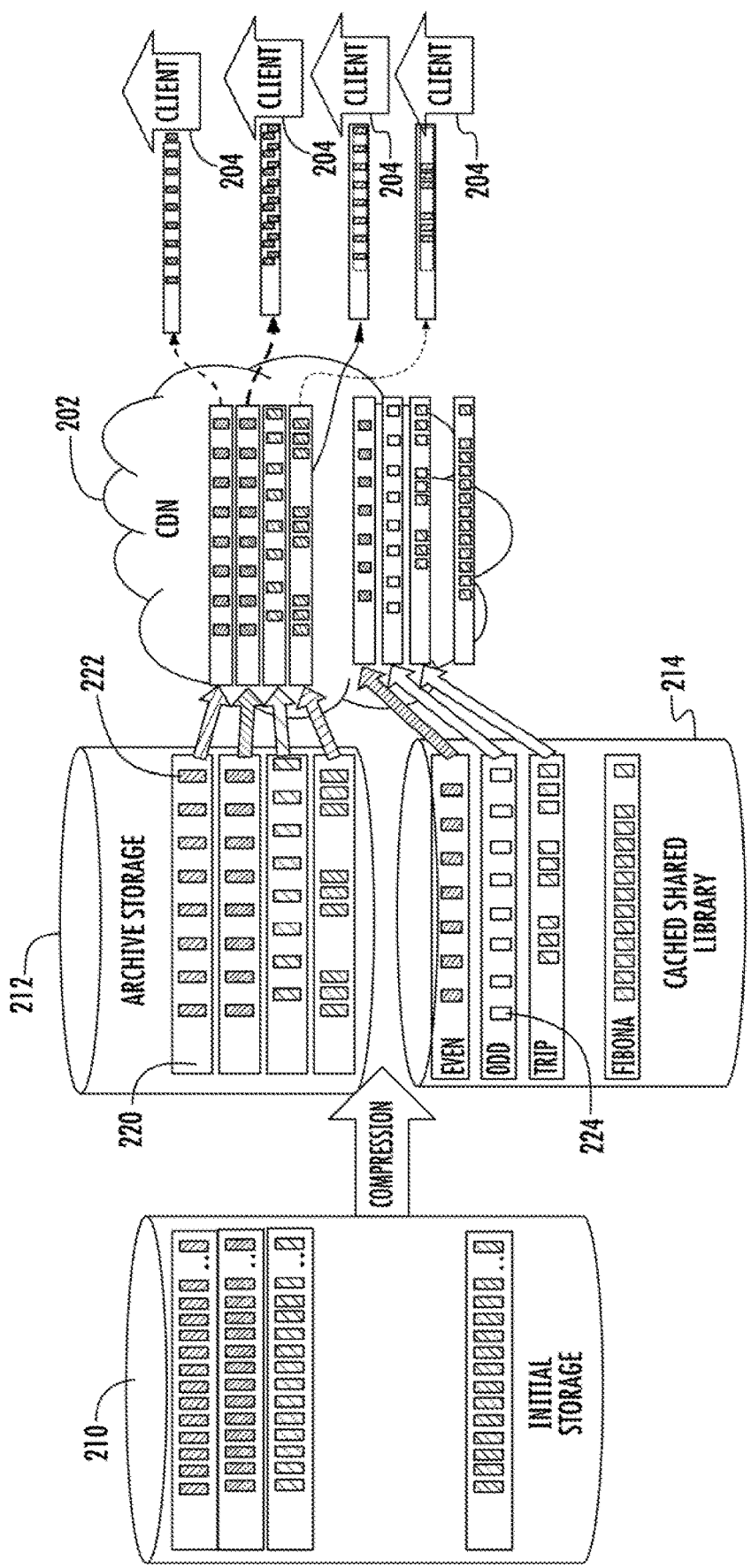
FIG. 2B is a functional block diagram illustrating an exemplary process for delivery of compressed (unique and shared) content in the context of the architecture of FIG. 2.

Referring now to FIG. 2B, another exemplary process for providing cDVR capabilities is illustrated in the context of the architecture 200 of FIG. 2; i.e., when a request for playback of the recorded content is not received within the threshold period of time (discussed above). In this case, the uncompressed individual assets of the content are automatically retrieved from the storage device 210, compressed and stored in archival storage 212. In one embodiment, similar to the storage device 210, the archival storage 212 may comprise a plurality of private storage locations (e.g., private folders) unique to each household, user or client device 204*a-c* such that all assets requested to be recorded by each household, user or client 204*a-c* may be stored in one or more of the private locations.

The "compression" applied in the process of FIG. 2B may include both (i) virtual storage compression (discussed in greater detail below), as well as (ii) compression via encoding, transcoding, and/or transrating, each of which are described above with respect to the packager 216. Such functionalities may be distributed across two or more of the network entities discussed herein as well (e.g., packager 216, cDVR server 218, and/or DN 202).

In terms of the virtual compression scheme, some of the segments of the content asset are designated as "shared" segments 224 via a segmentation process (described in further detail below). The shared segments may be sent to a shared library or database 214. In one variant, the shared library 214 may comprise a DN cache, such as an edge cache disposed at or proximate an edge of the DN 202 (as opposed to a core portion of the MSO network). In some embodiments, the cached shared library 214 may selectively cache (and de-cache video content in the network so as to reduce content transformation requirements and also cache storage requirements using the methods and apparatuses described in co-owned U.S. patent application Ser. No. 11/904,375 filed on Sep. 26, 2007, issued as U.S. Pat. No. 8,561,116 on Oct. 15, 2013 and entitled "METHODS AND APPARATUS FOR CONTENT CACHING IN A VIDEO NETWORK", which is incorporated by reference herein in its entirety.

Furthermore, the shared library 214 may reside on the DN 202 or outside of the CDN 202, as illustrated in the architecture of FIG. 2C, where a plurality of edge caches 226 within the DN 202 are used to store the shared library elements. In this exemplary embodiment of FIG. 2C, the DN 202 provides cached "shared" portions or segments for all users who request playback of the same (requested) content element, without having to request the shared data from the initial or archive storage. As the shared segments from the shared database 214 within the cache(s) 226 are able to take the shortest path through the DN 202 to the requesting user, any latency, segmenting or assembly inefficiencies associated with storing the non-shared portions of the content element(s) (i.e., at the initial or archive storage) are recuperated or compensated for. The client device receives a video stream that includes (i) segments 222 sourced from storage 212 streamed via the packager through DN 202 to the client device and (ii) a complement of segments 224 sourced from the shared database 214 streamed to the client device from the CDN edge-caches 226.

Additionally, while described in the context of cloud-based storage entities, it will be recognized that the private storage 210, archival storage 212, and shared library 214 may each be extended to other virtual storage systems as well, whether within the MSO network or otherwise, including being maintained by third parties. For instance, the MSO may get "a better deal" from a mass cloud storage provider due to e.g., economies of scale, than if the MSO procures and maintains its own infrastructure.

Methods—

Figure 3:
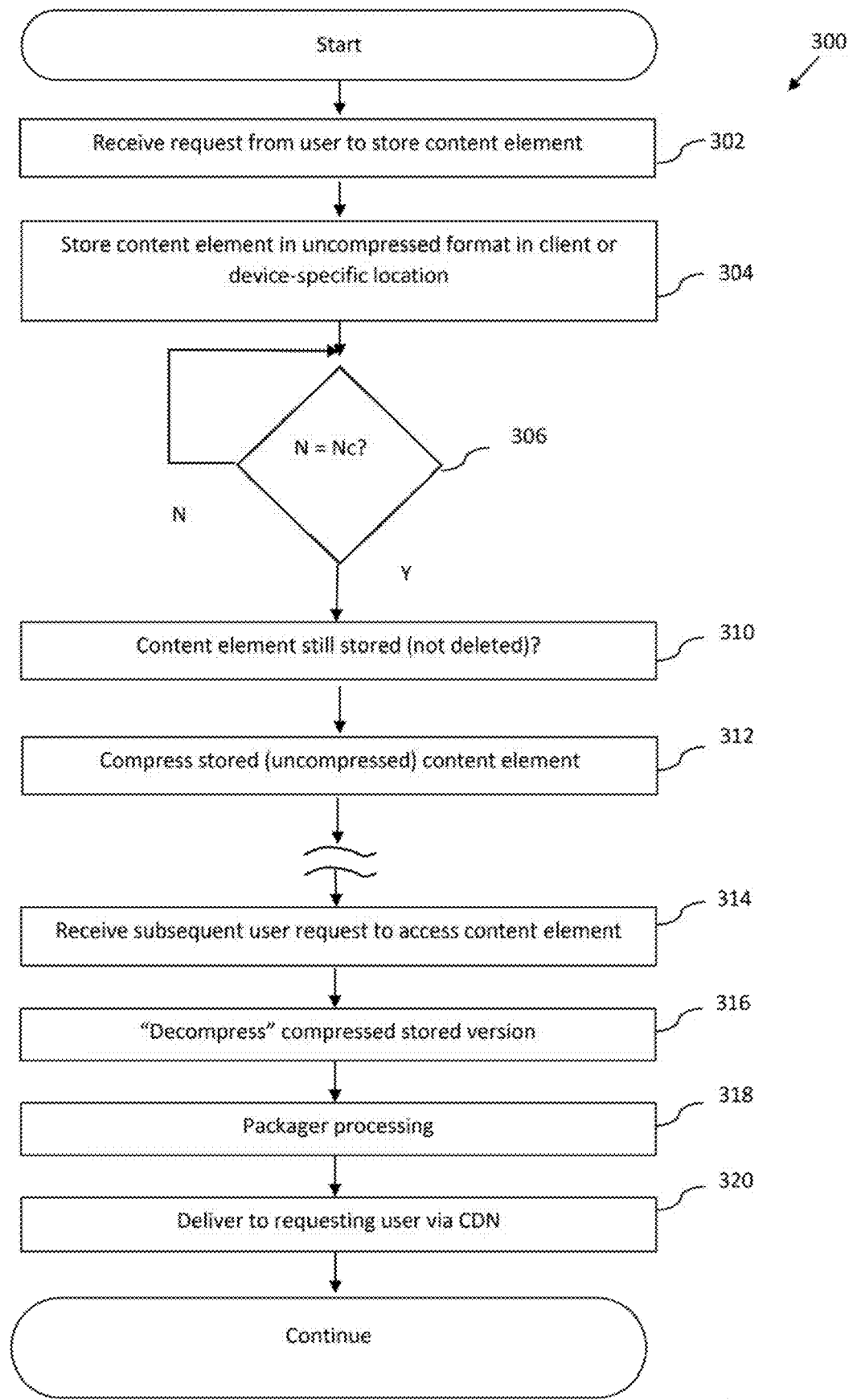
FIG. 3 is a logical flow diagram representing one embodiment of a generalized method for storing and accessing a content asset.

Referring now to FIG. 3, one embodiment of a generalized method 300 for recording and delivering content is disclosed. In practical embodiments, some of these steps (or sub-steps within each step) may be implemented in parallel, on different hardware platforms or software environments, performed iteratively, and so forth.

In the first step (step 302) of the method 300, a request may be received to record an asset. Prior to the request, the desired content may be made available for recording via a selected communication channel. This may be in response to a user request for the content instigated from a client 204*a-c*, or may be as a result of action taken at the head-end or other network node (including a third party content server), such as where the delivery of content is conducted according to a predetermined schedule.

At step 304, an uncompressed individual asset or content element is recorded or transferred onto the storage entity 210 and stored in a user- or device-specific storage location. This recording or transfer may take place during the receiving process; e.g., where the received data is stored and then immediately recorded onto the storage 210 in a continuous fashion. In some embodiments, clients or households 204*a-c* have the ability to select different start and end times for the recording and thus, not all segments of the asset may be recorded for all users.

At step 306, the predetermined one or more criteria (e.g., time since recordation, such as N=72 hours) is/are evaluated; when the criterion/criteria is/are met, the presence of the recorded uncompressed content element is optionally verified (step 310), and retrieved content element is then compressed per step 312.

In one embodiment, the threshold criteria (e.g., period of time such as N=72 hours) is determined by a network entity. The threshold period of time may be pre-determined and constant across all users/households (i.e., macro-based threshold time duration, such as a time period when most devices or households are known via anecdotal or other data to request playback of at least a portion of content subsequent to requesting a recording of that content), applied to only subsets thereof, or even individualized to the particular household or client 204*a-c* (e.g., a micro-based threshold time duration, such as based on a user's prior historical recording activity).

In one variant, if the determined threshold time period has not been reached, per step 306, the uncompressed asset remains in storage 210 until either a request for playback is received, the threshold time period is reached, or the asset is purged from the system.

It is contemplated that the aforementioned compression and segmentation may occur concurrently, or the compression may occur before the segmentation. It is further appreciated that the compression and/or segmenting processes may comprise one or more software applications run on a processor, or on a separate headend or non-headend entity, or on the digital processor of any of the aforementioned headend entities.

Upon receipt of a user request for access to the recoded content element (step 314), the (virtually) compressed stored element is "decompressed" (i.e., the constituent unique and shared components identified) per step 316, including any requisite supporting processing to generate e.g., the manifest file associated with the content element (step 318) to enable delivery via the DN 202 to the requesting user device (step 320).

In the exemplary embodiment, the packager 216 generates a manifest file associated with the recorded content per step 318. Specifically, the manifest file is a data structure comprising a listing of addresses for each of the media segments of a stream of data, and includes information about the media segments such as bitrates, closed captioning, audio, etc. Different ABR models may use different manifest files. For example, with HTTP Smooth Streaming (HSS), each of the components (closed captioning, audio, etc.) are in separate files with addresses for each in the manifest file.

With HTTP Live Streaming (HLS), audio is embedded in the segments and thus are not separately listed in the manifest file.

In another embodiment, the manifest file includes metadata, and a listing of media segment entries. Metadata refers to information used by a client device to interpret or otherwise manage the media segments (metadata is also colloquially referred to as "data regarding data" or "data relating to data"). Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media segments and can be used as a reference file when assessing or otherwise making use of the media segments.

In one implementation, the list of media segment entries in the manifest file comprises a list of network addresses (which may be remote or local) where the corresponding segments of media content may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment in a file structure) or relative (i.e., the path provides a relative location of the segment in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models.

In another embodiment, the service provider or MSO is represented as a single logical entity (a single network domain) represented by a characteristic URL (e.g., www-.timewarnercable.com). In other embodiments, the service provider may be a conglomeration of multiple logical entities. Multiple logical entities may be useful to further distribute services over various network resources or enable additional features provided by partnered corporations or providers. Multiple logical entities, for example, may provide local content for a particular service group or geographic area. Furthermore, having content providing entities closer to end users may offer lower latency and may add network redundancy. Common examples of network resources include e.g., broadcast, multicast, video-on-demand, advertisement services, local services, etc. In one specific example, one exemplary stream manifest file may include entries from: www.timewarnercable.com, vod.timewarner.com (video on demand services), www.nhk.jp ($3^{rd}$ party content), www.adserver.com ($3^{rd}$ party advertisement services), etc.

In another example, the media segment listing may include a listing of URL links which is further punctuated with HTML tags or Javascript, which is configured to enable advertisement insertion and/or execution of complementary programming. For instance, the video client may substitute tailored locally stored advertisements for commercial breaks, rather than e.g., the default broadcasted commercial. In other embodiments, the video client may run a Javascript Applet that allows the subscriber to execute a command or otherwise provide feedback (e.g., to order pizza, vote on a reality show, etc.). Exemplary apparatus and methods for selection of secondary content to be inserted (e.g., via a "targeted" approach) are described in co-owned and co-pending U.S. patent application Ser. No. 11/186,452 filed on Jul. 20, 2005 and entitled "METHOD AND APPARATUS FOR BOUNDARY-BASED NETWORK OPERATION", U.S. patent application Ser. No. 12/766,433 filed on Apr. 23, 2010 and entitled "APPARATUS AND METHODS FOR DYNAMIC SECONDARY CONTENT AND DATA INSERTION AND DELIVERY", as well as co-owned U.S. patent application Ser. No. 12/284,757 filed on Sep. 24, 2008, issued as U.S. Pat. No. 9,071,859 on Jun. 30, 2015, and entitled "METHODS AND APPARATUS FOR USER-BASED TARGETED CONTENT DELIVERY", each of which are incorporated herein by reference in their entirety, although other approaches may be used consistent with the present disclosure.

In the exemplary embodiment, each media segment is an encoded and encrypted subsection or segment of media content. The media segments, when decrypted, decoded, and played in the appropriate order, render the original media content. In one implementation, each media segment represents a portion of video associated with a specific resolution, codec, and time stamp. The media segments are assembled according to a time stamp sequence.

In another embodiment, non-time-based segments may be used in the manifest file. For example, playback may occur according to the context of the sequence and not because of any implied meaning of the filename, or time stamp value. The true duration of a video segment is based on its contents and its presentation time stamp (PTS), which may not be represented in the manifest file. The sequence of the next media file listed in the manifest file is simply what comes next. Specifically, any schema could be used for the transport stream files in the manifest file, including 1.ts, 2.ts, 3.ts, etc., or A.ts, B.ts, C.ts.

The encoding parameters, or a combination of any of the encoding parameters, may be utilized between the DN 202 and/or the packager 216. For example, the packager 216 may utilize the segmentation duration parameters in order to splice the content streams into segments. In another example, the packager 216 may utilize capabilities information of the end device 204*a-c* to create segments from the output streams that meet the specifications of the requesting device 204*a-c* (and put those addresses of those segments in a manifest file).

In yet another example, the packager 216 may utilize the key frame period parameter to generate a key frame manifest for implementing trick play mode operations (e.g., fast forward, rewind, pause, and/or random seek) when viewing the content. Various techniques may be used to provide trick play mode operations.

The manifest files listing all components for playback of a piece of content may be generated by the packager 216 based on the registration of a user. In an alternative embodiment, the manifest file (or a plurality of manifest files) is pre-generated for use with one particular ABR format. The manifest files are generated based on the specific device and requirements of an end user device. For example, the Microsoft® Xbox® 360 and Xbox® One video game systems require different manifest files to operate. Furthermore, different streaming standards may require different manifest files to operate. For example, the MPEG-Dynamic Adaptive Streaming over Hyper Text Transfer Protocol (DASH) protocol may be implemented differently with respect to Hyper Text Transfer Protocol (HTTP) live streaming and Windows® Media Streaming. Thus, each may require different manifest files.

Media segments and shared segments may be generated by the packager or other components within the MSO network. The segments may be of predetermined length. For example, a media segment encrypted using an AES algorithm may have a length of 64 bytes. In addition, metadata describing the segments may be generated at the packager 216, or, alternatively at other entities of the MSO network. As discussed herein, the media segments form the basis for the generation of a manifest file.

Additionally, the media segments may be encrypted by the packager 216 (such as via a DES or AES algorithm via a symmetric or asymmetric key approach) prior to transfer over the network. The media segments may then be decrypted by a client device 204a-c.

Additional services may utilize the segments and/or the service of the packager 216 to perform real-time services for a client device 204. For example, the segments may be used for advertisement insertions. Network operators may use advertisement breaks during the presentation of the content or adjacent to the time stamp of the product placement to utilize the product placement time stamp to sell or place the advertisement block. The network operator may sell or place an advertisement for the company whose product has been placed (or, e.g., to a competitor of that company). For example, if a Coke® can is used in a scene of a movie, advertisement blocks could be sold to Coca-Cola® or to Pepsi® during an advertising segment adjacent to the Coke can's appearance in the movie.

Upon receipt of the user-initiated request for playback (such as via an upstream SSP or LSCP command) (step 314), the user's individual compressed asset is uncompressed and assembled on-demand using unique information (e.g., encryption keys, supported resolutions, and digital rights information) from the unique private chunk storage entity 214 and a shared chunk storage entity 216 per step 316.

The aforementioned "virtual decompression" may be performed or assisted by other network entities as well. One such network entity may include the staging processor of the type described in co-owned U.S. patent application Ser. No. 10/860,969 filed Jun. 2, 2004, issued as U.S. Pat. No. 8,392,952 on Mar. 5, 2013 and entitled "Programming content processing and management system and method", and U.S. patent application Ser. No. 12/406,881 filed Mar. 18, 2009, issued as U.S. Pat. No. 9,277,266 on Mar. 1, 2016 and entitled "Apparatus and methods for network video recording", each of which are incorporated by reference herein in their entirety. Other approaches may be used with equal success as well.

Accessed unique or shared chunk data may also be pushed to a server within the DN 202 (such as via a File Transfer Protocol or FTP "push" of the type well known in the networking arts) which, in turn, provides it to the client or household 204a-c. Other technologies may be used for this purpose as well, including for example network attached storage such as CIFS (Common Internet File System), SAMBA (e.g., SAMBA 3.2), etc. It is also appreciated that in another embodiment, the (distributing) server may be adapted to pull the assembled content from the respective storage locations upon client 204a-c request.

Figure 3A:
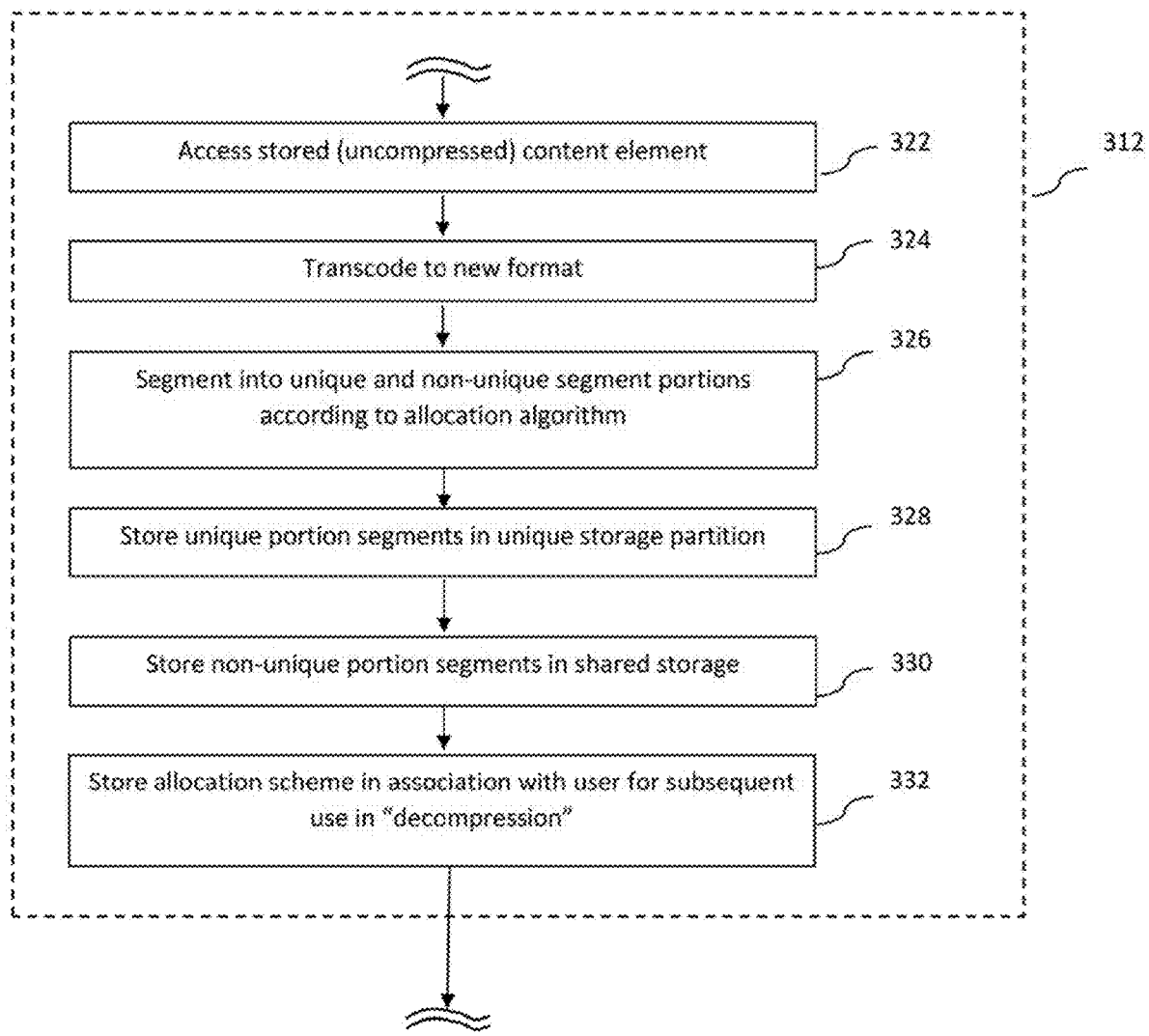
FIG. 3A is a logical flow diagram representing one embodiment of a method for virtual content compression processing in accordance with the method of FIG. 3.

FIG. 3A shows one exemplary embodiment of the methodology of compression per step 312 of FIG. 3. Specifically, in the illustrated embodiment, the uncompressed (and unique) content element is first accessed from "unique" storage (i.e., storage device 210) per step 322.

Next, per step 324, the content is optionally transcoded to another format (e.g., "encoding compressed" such as from MPEG-2 to MPEG-4 AVC) per step 324. The segmentation or allocation algorithm is next used to segment the content element into at least two portions; i.e., the unique portion, and the complementary portion (step 326). The segmenting process generally functions to segment the content at I-frames according to a schedule. In a further embodiment, the segmentation process comprises identifying or generating various sequences of "shared" segments, i.e., numeric complements, which may be shared by multiple ones of the devices or households 204. The numeric complements may be of any sequence (e.g., even, odd, triplets (i.e., three sequential segments), Fibonacci series, etc.).

A network entity (e.g., supervisory process such as e.g., one running on the cDVR server 218) assigns each household or client device 204a-c with one or more numeric combinations or strategies of the complements (e.g., only even, or even and odd, etc.). In one embodiment, the assignment is random, but in a way that guarantees uniqueness for each stream delivered to the devices or households 204a-c. This functionality is also provided by virtue of storage of two or more physically different but content-identical versions of the shared complement (e.g., all the "odds" for a client whose allocation scheme for the unique segments was "all evens"). Each of these physically different versions of the shared complement can be uniquely combined with a given user's unique (non-shared) stored segments or portion, thereby creating a significant degree of uniqueness (albeit with essentially no content-wise diversity), so as to inter alia maintain a high degree of orthogonality between combinations for individual users. Thus, the number of complements 224 stored for each household or device 204a-c creates the uniqueness for each stream delivered to the devices or households 204a-c. The more numeric complements that are used, the more uniqueness (and orthogonality) can be created.

Next, per step 328, the unique portion 220 (i.e., a plurality of segments or chunks of video and/or audio data selected based on the particular scheme chosen for the user or their request) are stored in the relevant unique storage portion of the archival storage device 212, while the common or shared complementary portion is stored in shared storage 214 (step 330).

Lastly, the allocation algorithm or scheme used to segment the content element, (e.g., even-numbered segments, odd-numbered segments, triplets, Fibonacci, etc.) is stored (in association with user- or client-specific data for identification) so as to permit a subsequent software process (e.g., the packager when assembling the manifest file, or even the client player application) to identify the scheme used so it can obtain a proper shared complement.

Exemplary Bearer Network Architecture—

Figure 4A:
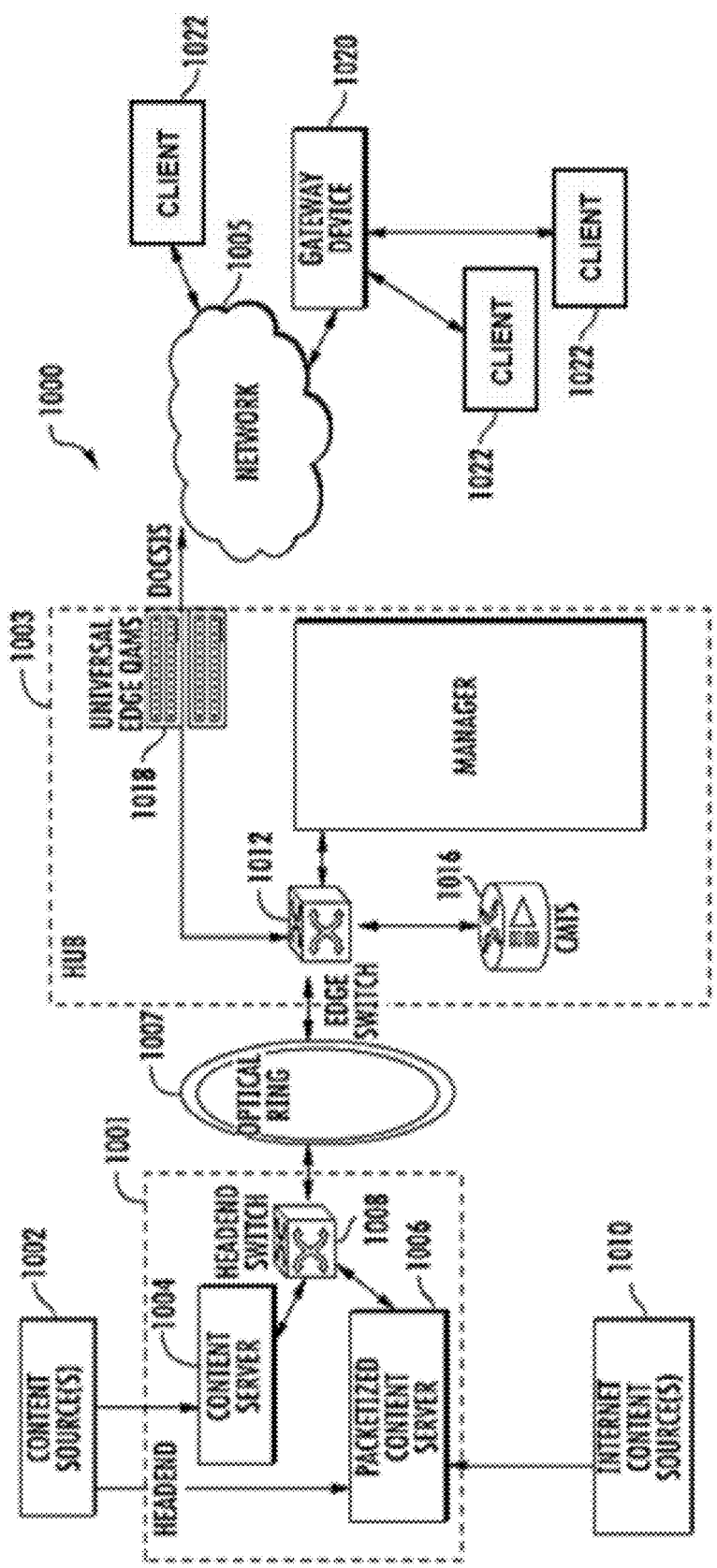
FIG. 4A is a functional block diagram illustrating one exemplary managed packetized content delivery network infrastructure useful with various aspects of the present disclosure.
Figure 4B:
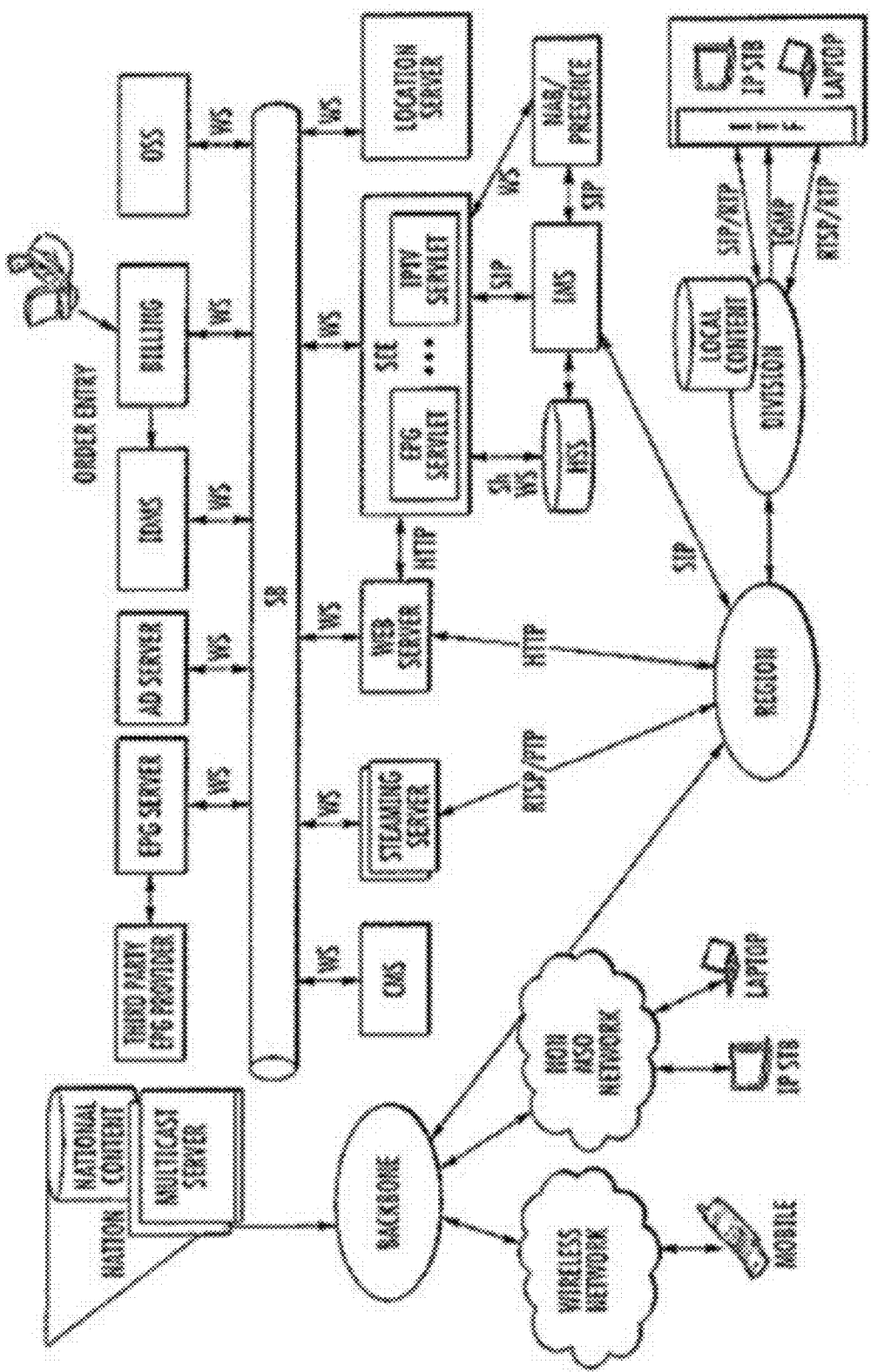
FIG. 4B is a functional block diagram illustrating a second exemplary managed packetized content delivery network infrastructure useful with various aspects of the present disclosure.

Referring now to FIGS. 4A and 4B, various exemplary embodiments of MSO network infrastructure used to implement the architecture of FIGS. 2-2C are now described. It will be appreciated that while primarily described in the context of a managed HFC, HFCu or satellite network (e.g., a cable, fiber, hybrid coax/copper, or satellite network) operated by an MSO, the principles and features described herein may be applied to unmanaged networks such as the Internet, or yet other topologies or architectures, the following being merely illustrative.

As is well known, in addition to "broadcast" or linear content (e.g., video programming), cable network systems also deliver high-speed data services using the Internet protocol (IP). One exemplary delivery paradigm comprises delivering video transported to user clients (or IP-based STBs) over the aforementioned DOCSIS channels comprising MPEG (or other video codec such as H.264 or AVC) over an IP transport (e.g., OSI network layer) over MPEG. That is, the higher layer MPEG-4 AVC/H.264 or other encoded content is encapsulated using an IP network protocol, which then utilizes an MPEG packetization of the type well known in the art for delivery over the RF QAM-modulated channels of the cable bearer medium. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC, tablet, or other IP-enabled device via the user's cable modem. Delivery in such packetized modes may be unicast, multicast, or broadcast. Delivery of the IP-encapsulated data may also occur over the non-DOCSIS QAMs.

FIG. 4A illustrates an exemplary network architecture for the delivery of packetized content that may be useful with the present disclosure. It will be recognized that in addition to delivering Internet data services using the Internet protocol (IP) transport (i.e., IP-over-HFC QAM), the system of FIG. 4A may also be configured to deliver on-demand (e.g., VoD, start-over, nPVR) and linear broadcast content as well. However, the following discussion focuses on the HSD/IP-packetized transport infrastructure of the network of FIG. 4A as the primary content delivery mode.

The illustrated network 1000 generally comprises a local headend 1001 in communication with at least one hub 1003 via an optical ring 1007. The distribution hub 1003 is able to provide content to various user devices, client devices 1022, and gateway devices 1020, via a network 1005.

Various content sources 1002 are used to provide content to a content server 1004, as described previously herein.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 4A, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

The network 1000 of FIG. 4A may further include a legacy multiplexer/encrypter/modulator (MEM; not shown) coupled to the network 1005 adapted to "condition" content for transmission over the network. In the present context, the content server 1004 and packetized content server 1006 may be coupled to the aforementioned LAN, thereby providing access to the MEM and network 1005 via one or more file servers (not shown). The content server 1004 and packetized content server 1006 are coupled via the LAN to a headend switching device 1008 such as an 802.3z Gigabit Ethernet (or incipient "10G") device. Video and audio content is multiplexed at the headend 1001 and transmitted to the edge switch device 1012 (which may also comprise an 802.3z Gigabit Ethernet device).

Individual client devices 1022 of the implementation of FIG. 4A may be configured to monitor the particular assigned RF channel (such as via a port or socket ID/address, or other such mechanism) for IP packets intended for the subscriber premises/address that they serve.

The edge switch forwards the packets receive from the CMTS to the QAM modulator, which transmits the packets on one or more physical (QAM-modulated RF) channels to the client devices. The IP packets are typically transmitted on RF channels that are different than the RF channels used for the broadcast video and audio programming, although this is not a requirement. As noted above, the client devices (e.g., DOCSIS modems) are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 and distributed to one or more client devices 1022 in communication therewith. Alternatively, the client devices 1022 may be configured to receive IP content directly without need of the gateway or other intermediary.

It is still further appreciated that the delivery of content may include delivery from an "off-net" distribution hub (not shown) to another network (not shown), not associated with the MSO. In this embodiment, a requesting device (such as client device 1022 or gateway 1020) may request content from a local headend 1001 which is transferred over both MSO-maintained ("on-net") and "off-net" networks advantageously.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 4B illustrates one exemplary implementation of such a network, in the context of a 3GPP IMS (IP Multimedia Subsystem) network with common control plane and service delivery platform (SDP), as described in co-pending U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

cDVR-Enabled Client Device

Figure 5:
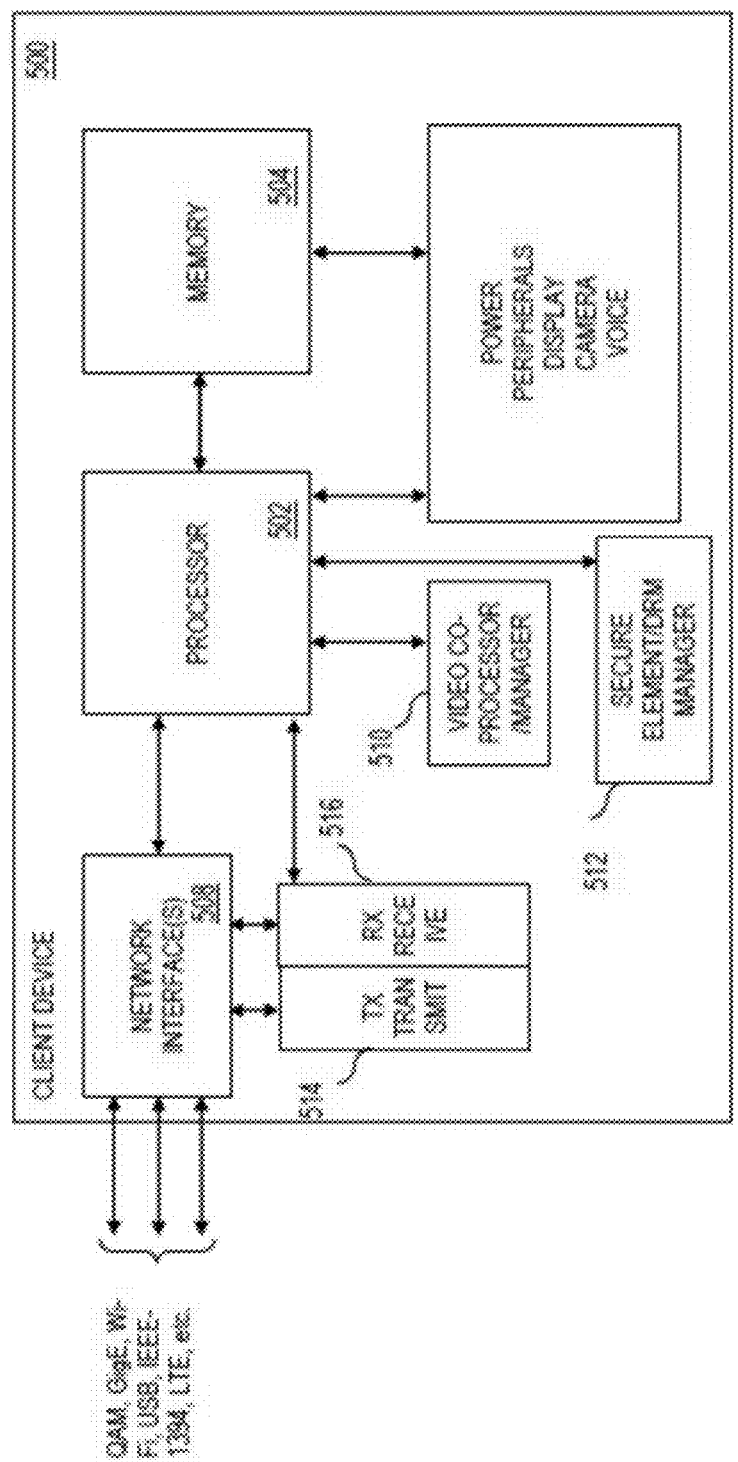
FIG. 5 is a functional block diagram of an exemplary embodiment of a preview-enabled client device apparatus according to the present disclosure.

FIG. 5 illustrates an exemplary client device 500 according to the present disclosure. As shown, the client device 500 includes, inter alia, a processor subsystem 502, a memory module 504, one or more radio frequency (RF) network interfaces 508, a transmit module 514, video co-processor and manager 510, a secure element (SE) and DRM manager 512, and a receive module 516.

In one exemplary embodiment, the processor 502 may include one or more of a digital signal processor, microprocessor, field-programmable gate array, or plurality of processing components mounted on one or more substrates (e.g., printed circuit board). The processor subsystem 502 may also comprise an internal cache memory. The processor subsystem is in communication with a memory subsystem 504, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem 502 is configured to execute at least one computer program stored in memory 504 (e.g., a non-transitory computer readable storage medium). A video co-processor 510 and SE/DRM Manager 512 are also in data communication with the processor subsystem 502, and collectively the foregoing components include a plurality of computer programs/firmware configured to perform the functions described supra, e.g., decryption, manifest unpacking, decode, preview/trickmode image display, as well as various assorted functions useful for and typical in consumer electronics including baseband management (e.g., transmit and receive functions via the baseband processor and associated TX and RX modules 514, 516. For example, in one implementation, the client comprises one or more media player "apps" (e.g., capable of decoding and rendering MPEG-4 AVC video and associated audio), such as that received and assembled from the various URLs or storage locations specified in the manifest files, correlating to the unique and shared portions of the requested content element(s).

In one implementation, the player app is integrated into an MSO-specific app which also manages, e.g., entitlements (i.e., the user's authentication and privileges under a subscription package pursuant to which the content is being delivered), scheduling of future recordings, an "EPG" or electronic program guide function, security (e.g., DRM or CA), and other MSO-provided features and functions.

In one or more embodiments, the video co-processor/manager and SE/DRM manager each include an internal cache or memory configured to hold data associated with one or more functions (e.g., decoded video frames, decryption keys, etc.). In some embodiments, application program interfaces (APIs) such as those included in an MSO-provided mobile application or those natively available on the client device 500 (e.g., as part of the decode/display computer program noted supra, or exclusively internal to the manager modules 510, 512) may also reside in the internal cache(s), or other memory 504.

In one embodiment, the radio frequency interface 508 is configured to transact one or more network address packets with other networked devices according to a network protocol, e.g., RF QAMs in an HFC network, a MoCA premises network interface, OFDM carriers in a Wi-Fi or LTE network, and so forth.

Network addressing may provide each node of a network with an address that is unique to that network; the address can be used to communicate (directly via peer-to-peer communications, or indirectly via a series of "hops") with the corresponding device. In more complex networks, multiple layers of indirection may be used to assist in address exhaustion (e.g., one address is logically divided into another range of network addresses). Common examples of network routing protocols include for example: Internet Protocol (IP), Internetwork Packet Exchange (IPX), and OSI-based network technologies (e.g., Asynchronous Transfer Mode (ATM), Synchronous Optical Networking (SONET), Synchronous Digital Hierarchy (SDH), Frame Relay).

A radio/modem subsystem of the client device 500 comprises a TX transmit module 514 and RX receive module 516, which communicate with the RF network interface 508. The network interface 508 generally incorporates an assembly of filters, low noise amplifiers (LNAs), power amplifiers (PAs), and antenna assemblies that are configured to transmit a modulated waveform via an air interface. As shown, the radio/modem subsystem may be configured to support MIMO (multiple input, multiple output) antenna technology in which multiple antennas are used to transmit and receive signaling. With MIMO, multiple independent data streams can be transmitted in parallel using the same time-frequency resource. To distinguish the data streams sharing this same time-frequency resource, spatial division multiplexing is applied. Those of ordinary skill in the related arts will readily appreciate that SISO (single in, single out), SIMO (single in, multiple out), and MISO (multiple in, single out) antenna schemes may be substituted with equivalent success.

The client apparatus 500 of the present embodiment comprises a mobile consumer electronics device, such as, but not limited to mobile devices such as handheld computers, PDAs, personal media devices (PMDs), smartphones, tablets, and "phablets,", and personal computers (PCs), and minicomputers, whether desktop, laptop, or otherwise. Artisans of ordinary skill will readily appreciate that consumer electronics devices may incorporate various other assorted components necessary to support typical functions of such devices, including power modules, peripherals modules, display modules (associated with, e.g., a display screen, UI, GUI), camera modules, voice codec modules, etc. Moreover, the methods and apparatus described herein may also readily be adapted to e.g., other types of client devices/CPE including e.g., Smart TVs, digital set-top boxes (DSTBs), etc.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of managing digitally rendered content within a content delivery network for at least one of a plurality of users of the content delivery network, the computerized method comprising:

receiving, at a computerized entity of the content delivery network, data representative of a request to record the digitally rendered content, the request originating from a computerized client device associated with the at least one of the plurality of users of the content delivery network;

based at least in part on the request, causing at least a first portion of the digitally rendered content to be stored on a first storage device of the content delivery network, the at least first portion of the digitally rendered content stored at a storage location specifically associated with the at least one of the plurality of users; and causing at least a second portion of the digitally rendered content to be stored at a storage location not specific to the at least one of the plurality of users;

wherein the second portion comprises a numeric complement of the first portion of the digitally rendered content, the numeric complement necessary to assemble the digitally rendered content such that the digitally rendered content is unique to the computerized client device associated with the at least one of the plurality of users when the numeric complement is assembled with the first portion, the assembly of the numeric complement with the first portion being in accordance with a numerical model assigned to the computerized client device associated with the at least one of the plurality of users.

2. The computerized method of claim 1, wherein the computerized method further comprises:

subsequent to said causing the at least first and second portions to be stored, receiving data representative of a request from the at least one of the plurality of users to access the digitally rendered content; and based at least on the request to access the digitally rendered content, assembling the digitally rendered content from both the storage location specifically associated with the at least one of the plurality of users and the storage location not specific to the at least one of the plurality of users.

3. The computerized method of claim 2, wherein the assembling the digitally rendered content comprises further assembling the digitally rendered content from both: (i) the storage location specifically associated with the at least one of the plurality of users, and the storage location not specific to the at least one of the plurality of users; and (ii) a storage location associated with a different one of the plurality of users.

4. The computerized method of claim 1, wherein the causing the at least first portion to be stored at the storage location specifically associated with the at least one of the plurality of users comprises storing the at least first portion so that it is only accessible to the at least one of the plurality of users.

5. The computerized method of claim 1, wherein the content delivery network comprises a managed network having a network operator, and the plurality of users comprise a plurality of subscribers who are bound to the network operator pursuant to respective subscription agreements.

6. The computerized method of claim 1, further comprising, based at least on a second request, causing delivery of the at least first and second portions of the digitally rendered content to another computerized client device associated with the at least one of the plurality of users.

7. The computerized method of claim 1, wherein the causing to be stored comprises transcoding at least one of the at least first and second portions of the content from a first encoding format to a second encoding format.

8. The computerized method of claim 7, wherein the first encoding format comprises a Moving Picture Experts Group (MPEG)-2 format and the second encoding format comprises an MPEG-4 AVC or H.264 format.

9. A computerized method of operating a content delivery network having a plurality of users, the plurality of users having a respective plurality of computer client devices associated therewith, the computerized method comprising:

receiving at least one digitally rendered content element from a content source;

receiving data representative of a plurality of requests from respective ones of the plurality of computerized client devices to record the at least one digitally rendered content element;

based at least on the plurality of requests, storing respective ones of first versions of the at least one digitally rendered content element, each of the respective ones of the first versions accessible only by the respective ones of the plurality of users associated with the respective ones of the first versions;

after expiration of a period of time, storing respective second versions of the at least one digitally rendered content element, the second versions being compressed with respect to the respective first versions thereof, and at least a portion of each of the second versions accessible by one or more users other than the respective one of the plurality of users associated with the respective one of the first versions; and storing a computerized allocation algorithm, the storing of the computerized allocation algorithm enabling a subsequent software process to identify a respective plurality of numerically-based schemes used for assembly of the at least one digitally rendered content element;

wherein the storing of the respective second versions of the at least one digitally rendered content element comprises at least storing the portion of each of the respective second versions accessible by one or more users other than the respective one of the plurality of users associated with the respective one of the first versions in a shared or common library data structure based at least on the computerized allocation algorithm; and wherein the assembly of the at least one digitally rendered content element comprises use of at least some of the stored ones of first versions and at least some of the stored portion of the second versions, based on the respective plurality of numerically-based schemes, the respective plurality of numerically-based schemes being assigned to respective ones of the plurality of computerized client devices such that uniqueness is created for each respective digital content stream delivered to the plurality of computerized client devices.

10. The computerized method of claim 9, further comprising dynamically determining, on a per-user basis, respective ones of the period of time, the storage of each of the respective second versions of the at least one digitally rendered content element based on the respective ones of the period of time.

11. The computerized method of claim 9, further comprising:
after the storing of the respective second versions, receiving a subsequent request from one of the plurality of users to access the at least one digitally rendered content element; and
accessing the respective second versions for the one of the plurality of users, the accessing comprising:
accessing the at least portion of the respective second versions from the shared or common library data structure;
accessing a remainder of the respective second versions from a user-specific data structure, the user-specific data structure being specific to the one of the plurality of users; and
assembling the accessed at least portion and the accessed remainder into a digital content stream for delivery to one of the plurality of computerized client devices.

12. The computerized method of claim 11, wherein the storing respective second versions of the at least one digitally rendered content element further comprises:
storing a first portion of the at least one digitally rendered content element at a first data storage location that is unique to one of the plurality of users associated with a respective one of the first versions.

13. The computerized method of claim 12, wherein the storing respective second versions of the at least one digitally rendered content element further comprises allocating a plurality of segments associated with the at least one content element between the first data storage location and the shared or common library data structure.

14. The computerized method of claim 13, wherein the allocation algorithm comprises identifying a plurality of numeric sequences or their complements, and the allocating of the plurality of segments comprises allocating the plurality of segments corresponding to one of the plurality of numeric sequences or its complement, the one of the plurality of numeric sequences comprising a Fibonacci sequence.

15. A content delivery network architecture configured to service a plurality of users, the content delivery network architecture comprising:
a first storage repository, the first storage repository configured to store ingested digitally rendered content elements obtained from a content source;
a second storage repository, the second storage repository in data communication with the first storage repository and configured to provide storage of at least first portions of each of the ingested digitally rendered content elements, respective ones of the at least first portions being uniquely associated with respective computerized client devices of the plurality of users; and
a third storage repository, the third storage repository in data communication with at least the first data storage repository and configured to provide storage of at least second portions of each of the ingested digitally rendered content elements, the at least second portions not being uniquely associated with any of the users; and
wherein the content delivery network architecture achieves storage compression at least through configuration to, based at least on a digitally rendered content element access request originating from a respective one of the respective computerized client devices of the plurality of users, utilize a randomized sequence assignment scheme to assign a respective unique first portion of the digitally rendered content element from the second storage repository to at least one of the at least second portions of the digitally rendered content element from the third storage repository to service the request by delivery of a digital content stream to respective one of the computerized client devices of the plurality of users; and
wherein the randomized sequence assignment scheme is assigned to the respective one of the computerized client devices of the plurality of users such that the digital content stream is unique to the respective one of the computerized client devices.

16. The content delivery network architecture of claim 15, wherein the content delivery network architecture further comprises a computerized packaging entity, the computerized packaging entity configured to assemble the respective unique first portion of the digitally rendered content element from the second storage repository and the second portion of the digitally rendered content element from the third data repository to support the servicing of the request.

17. The content delivery network architecture of claim 16, wherein the content delivery network architecture is configured to assemble the respective unique first portion of the digitally rendered content element from the second storage repository and the second portion of the digitally rendered content element from the third data repository to support the servicing of the request only after meeting of one or more criteria.

18. A content delivery network apparatus configured to service content requests originating from a respective plurality of computerized client devices associated with a plurality of users, the content delivery network apparatus comprising:
at least one data interface for data communication;
processing apparatus in data communication with the at least one interface; and
storage apparatus in data communication with the processing apparatus and comprising at least one computer program, the at least one program configured to, when executed on the processing apparatus:
store, within a first storage repository in data communication with the interface, the content element in its entirety, the first repository configured to store ingested digitally rendered content elements obtained from a content source and comprising a plurality of first storage locations uniquely associated with respective ones of the plurality of users;
thereafter, upon expiry of a prescribed period of time after receipt of a recording request relating to a digitally rendered content element, the request originated by a computerized client device of one of the plurality of users, access the first storage repository to retrieve the digitally rendered content element, the retrieved digitally rendered content element comprising a plurality of segments;
utilize an allocation algorithm to allocate the plurality of segments of the digitally rendered content element into at least first and second portions each having some of the plurality of segments, the at least first portion being uniquely associated with the one of the plurality of users, and the at least second portion being unassociated with any of the plurality of users;
store the at least first portion within a second storage repository in data communication with the at least one data interface, the second storage repository comprising a plurality of second storage locations uniquely associated with the respective ones of the plurality of users; and store the at least second portion within a third storage repository in data communication with the at least one data interface, the third storage repository comprising at least one location shared between each of the plurality of users;

wherein the allocation by the allocation algorithm comprises assignment of one of a plurality of different numerical models to the computerized client device of the one of the plurality of users.

19. The content delivery network apparatus of claim 18, wherein the allocation by the allocation algorithm comprises:

application of the selected one model to the plurality of segments of the digitally rendered content element so as to produce the first portion and the second portion, the second portion being a complement to the first portion and having none of the same segments.

20. The content delivery network apparatus of claim 19, wherein the plurality of different numerical models comprise at least an even numbered segment model, and odd numbered segment model, and a sequential segment model.

21. The content delivery network apparatus of claim 19, wherein the storage of the at least second portion comprises storage of multiple identical copies of the at least second portion.

22. A computerized method of managing digitally rendered content within a content delivery network for at least one of a plurality of users of the content delivery network, the computerized method comprising:

receiving, at an entity of the content delivery network, data representative of a request to record the digitally rendered content from a computerized client device associated with the at least one of the plurality of users of the content delivery network;

based at least in part on the request:

causing a first portion of the digitally rendered content to be stored on a first storage device of the content delivery network, the first portion of the digitally rendered content stored at a storage location specifically associated with the at least one user, the first storage device located at a first portion of the content delivery network; and causing at least one representation of a second portion of the digitally rendered content to be stored on a second storage device of the content delivery network, the at least one representation comprising a numeric complement of the first portion and being stored at a storage location not specific to the at least one of the plurality of users, the second storage device located at a second portion of the content delivery network different from the first portion of the content delivery network and providing reduced content transport cost as compared to the first portion of the content delivery network;

wherein the numeric complement is part of a numeric sequence assigned to the computerized client device associated with the at least one of the plurality of users such that the numeric sequence is configured to render the digitally rendered content unique to the computerized client device associated with the at least one of the plurality of users when assembled with the first portion.

23. The computerized method of claim 22, wherein the second portion of the content delivery network comprises an edge cache.

\* \* \* \* \*